United States Patent
Choi et al.

(10) Patent No.: US 11,726,612 B2
(45) Date of Patent: Aug. 15, 2023

(54) DISPLAY DEVICE AND METHOD OF DRIVING THE SAME

(71) Applicant: SAMSUNG DISPLAY CO., LTD., Yongin-si (KR)

(72) Inventors: Boram Choi, Asan-si (KR); Soojung Lee, Suwon-si (KR); Yuna Kim, Seoul (KR); Seungwook Chun, Daegu (KR)

(73) Assignee: Samsung Display Co., Ltd., Yongin-si (KR)

( * ) Notice: Subject to any disclaimer, the term of this patent is extended or adjusted under 35 U.S.C. 154(b) by 13 days.

(21) Appl. No.: 17/343,607

(22) Filed: Jun. 9, 2021

(65) Prior Publication Data

US 2022/0100311 A1    Mar. 31, 2022

(30) Foreign Application Priority Data

Sep. 29, 2020    (KR) .......................... 10-2020-0126457

(51) Int. Cl.
*G06F 3/041*    (2006.01)
*G06F 3/044*    (2006.01)

(52) U.S. Cl.
CPC .......... *G06F 3/0418* (2013.01); *G06F 3/0446* (2019.05); *G06F 3/04166* (2019.05)

(58) Field of Classification Search
CPC .. G06F 3/0418; G06F 3/04166; G06F 3/0446; G06F 3/041661; G06F 3/0443; G06F 3/0445; G06F 3/0412; G06F 3/044; H01L 27/323
See application file for complete search history.

(56) References Cited

U.S. PATENT DOCUMENTS

| | | | |
|---|---|---|---|
| 8,273,021 B2 | 9/2012 | Jang et al. | |
| 8,475,367 B1* | 7/2013 | Yuen | G16H 50/30 |
| | | | 177/4 |
| 8,773,390 B1* | 7/2014 | Clark | G06F 3/045 |
| | | | 345/173 |
| 9,501,451 B2 | 11/2016 | Miyamoto | |

(Continued)

FOREIGN PATENT DOCUMENTS

| | | |
|---|---|---|
| JP | 2012-118957 | 6/2012 |
| KR | 10-0862287 | 10/2008 |

(Continued)

*Primary Examiner* — Amy Onyekaba
(74) *Attorney, Agent, or Firm* — H.C. Park & Associates, PLC

(57) ABSTRACT

A display device includes a display panel, an input sensor, and a controller. The controller is operated in a first mode to sense a position at which a first external input is generated, or in a second mode to measure biometric information with respect to a second external input. The controller senses, in the first mode, the position based on a first mode sensing signal to which a variation in capacitance between a transmission electrode and a reception electrode by the first external input is reflected, the controller compensates, in the second mode, for a second mode sensing signal to which a variation in capacitance between the transmission electrode and the reception electrode by the second external input is reflected based on a compensation value to generate a compensation sensing signal, and the controller measures, in the second mode, the biometric information based on the compensation sensing signal.

20 Claims, 20 Drawing Sheets

(56) References Cited

U.S. PATENT DOCUMENTS

| | | |
|---|---|---|
| 10,034,616 B2 | 7/2018 | Park |
| 10,433,759 B2 | 10/2019 | Ahn et al. |
| 10,496,229 B2 | 12/2019 | Song et al. |
| 2008/0309625 A1 | 12/2008 | Krah et al. |
| 2012/0250949 A1* | 10/2012 | Abiko ................ G06T 1/00 |
| | | 324/661 |
| 2016/0235341 A1* | 8/2016 | Choi ................ A61B 5/6898 |
| 2016/0253539 A1* | 9/2016 | Shen ................ G06V 40/1306 |
| | | 382/124 |
| 2016/0358003 A1* | 12/2016 | Shen ................ G06V 40/1306 |
| 2016/0364591 A1* | 12/2016 | El-Khoury ........ G06F 3/04817 |
| 2017/0068838 A1* | 3/2017 | Kravets ............ G06F 3/04182 |
| 2018/0059824 A1* | 3/2018 | Song ................ G06F 3/04166 |
| 2018/0160545 A1* | 6/2018 | Kim ................ H04M 1/0277 |
| 2018/0196989 A1* | 7/2018 | Hong ................ G06V 40/1306 |
| 2018/0314379 A1* | 11/2018 | Shen ................ G06V 40/1318 |
| 2018/0348949 A1* | 12/2018 | Kim ................ G06F 3/0443 |
| 2019/0087628 A1* | 3/2019 | Choe ................ G06V 40/1335 |
| 2019/0114455 A1* | 4/2019 | Kim ................ G06F 3/0443 |
| 2019/0213374 A1* | 7/2019 | Kwon ................ G06F 3/0412 |
| 2019/0244566 A1* | 8/2019 | Kim ................ G09G 3/3233 |
| 2020/0050815 A1* | 2/2020 | Hong ................ G06F 3/044 |
| 2020/0264756 A1* | 8/2020 | Jin ................ G06F 3/0412 |
| 2021/0065622 A1* | 3/2021 | Chu ................ G06F 3/0412 |
| 2021/0067623 A1* | 3/2021 | D'Souza ............ G06V 40/1306 |
| 2021/0318782 A1* | 10/2021 | He ................ G06V 40/1365 |
| 2022/0100311 A1* | 3/2022 | Choi ................ G06F 3/0446 |

FOREIGN PATENT DOCUMENTS

| | | |
|---|---|---|
| KR | 10-2018-0025351 | 3/2018 |
| KR | 10-1868688 | 6/2018 |

\* cited by examiner

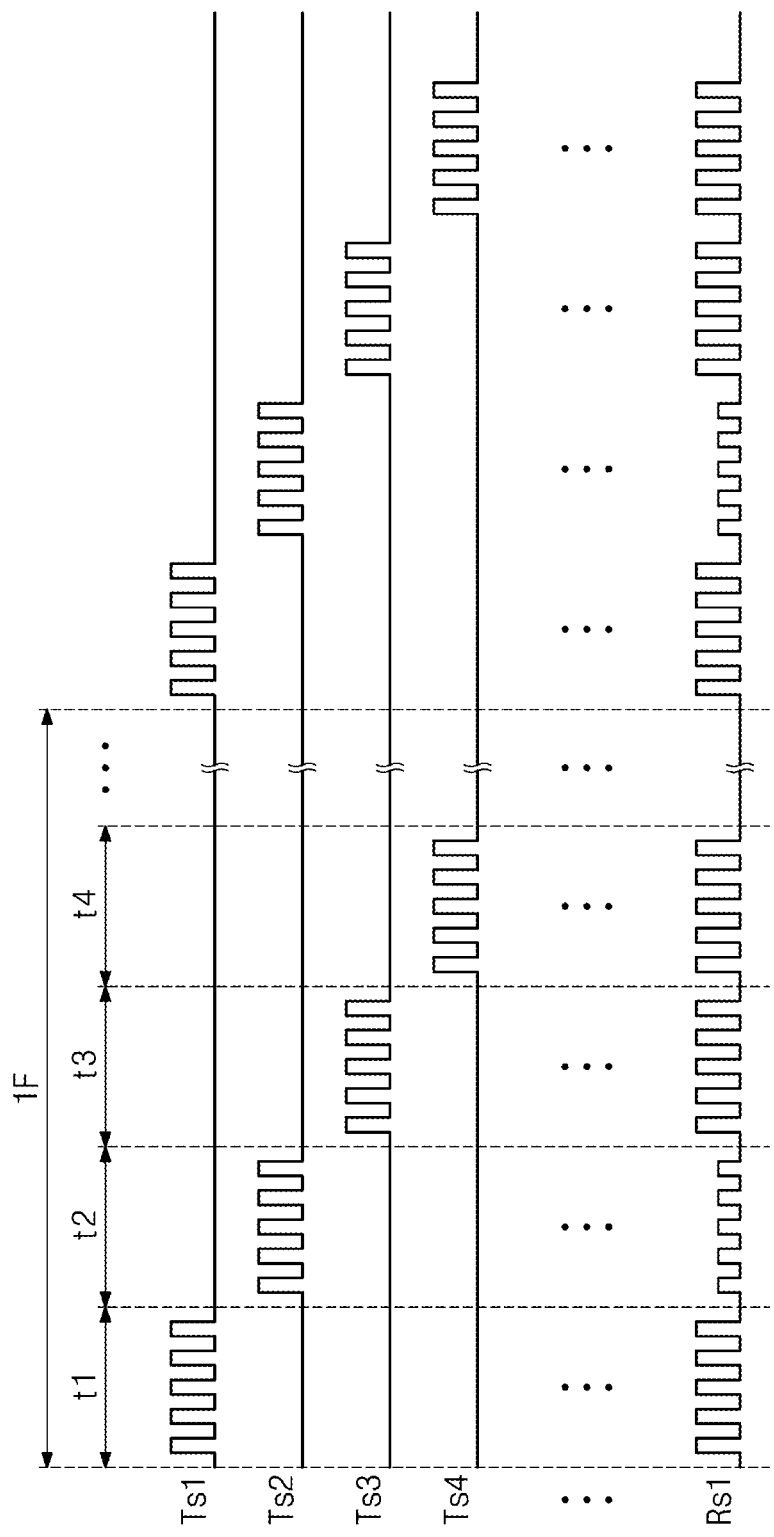

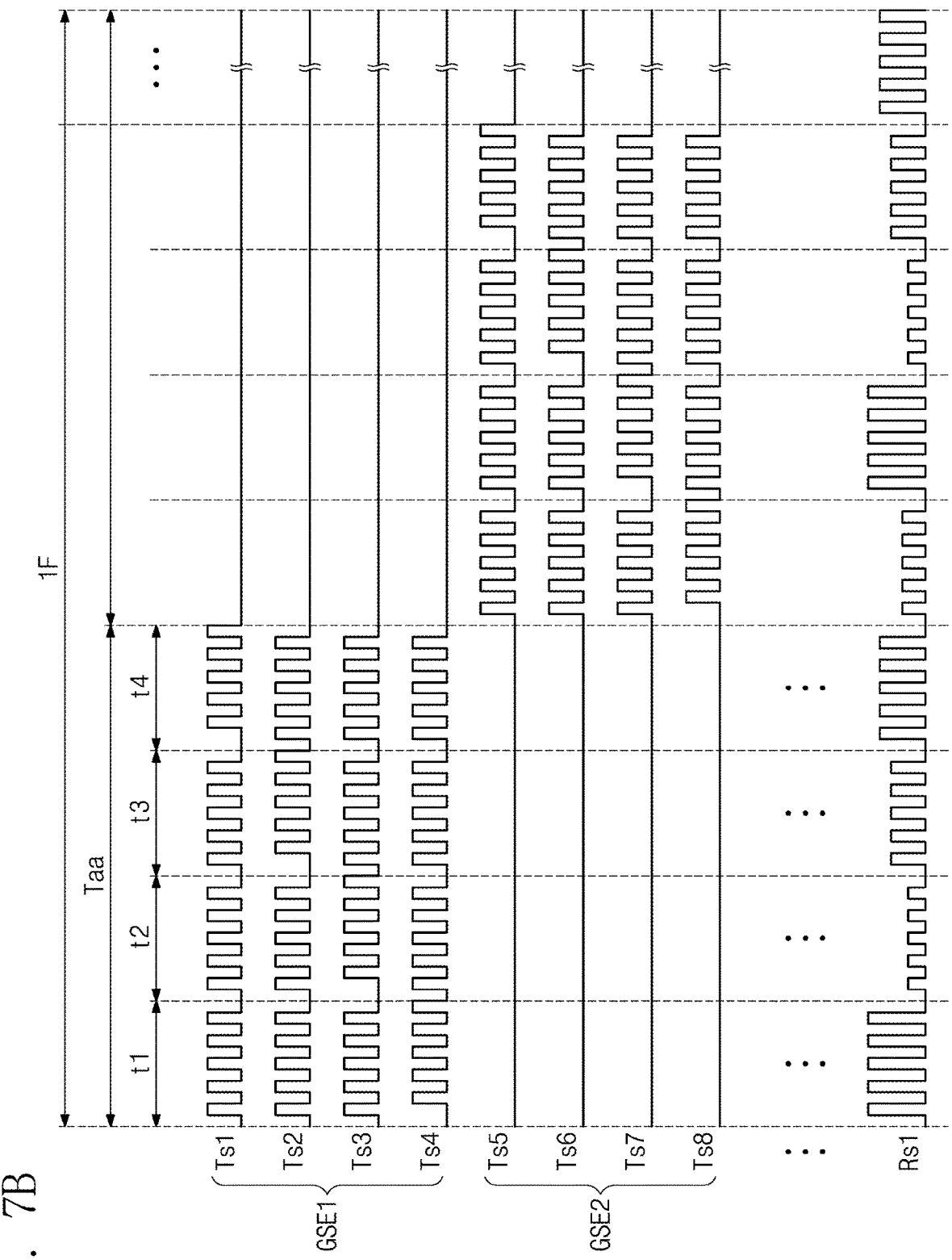

FIG. 9A

| | GSE1 | | | | GSE2 | | | | GSE3 | | | | GSE4 | | | |
|---|---|---|---|---|---|---|---|---|---|---|---|---|---|---|---|---|
| | SE1_1 | SE1_2 | SE1_3 | SE1_4 | SE1_5 | SE1_6 | SE1_7 | SE1_8 | SE1_9 | SE1_10 | SE1_11 | SE1_12 | SE1_13 | SE1_14 | SE1_15 | SE1_16 |
| SE2_1 | 37 | -5 | 17 | 5 | 17 | 13 | 14 | 17 | -1 | 3 | 5 | 11 | 6 | 4 | 4 | 2 |
| SE2_2 | 35 | 0 | 15 | 8 | 20 | 16 | 25 | 18 | 1 | 5 | 13 | 23 | 7 | 3 | 13 | 7 |
| SE2_3 | 31 | 4 | 11 | 4 | 35 | 27 | 76 | 31 | 7 | 15 | 17 | 66 | 12 | 22 | 30 | 16 |
| SE2_4 | 30 | 5 | 12 | 189 | 148 | 102 | 187 | 76 | 52 | 48 | 50 | 202 | 87 | 123 | 163 | 141 |
| SE2_5 | 65 | 116 | 58 | 207 | 214 | 208 | 205 | 207 | 205 | 211 | 214 | 214 | 215 | 217 | 218 | 208 |
| SE2_6 | 180 | 246 | 235 | 225 | 263 | 262 | 259 | 270 | 267 | 271 | 258 | 245 | 255 | 258 | 259 | 236 |
| SE2_7 | 175 | 251 | 248 | 235 | 255 | 265 | 265 | 270 | 265 | 264 | 259 | 261 | 254 | 259 | 260 | 240 |
| SE2_8 | 148 | 243 | 242 | 241 | 256 | 263 | 263 | 265 | 260 | 262 | 263 | 266 | 264 | 261 | 255 | 240 |
| SE2_9 | 184 | 249 | 241 | 242 | 245 | 259 | 264 | 263 | 261 | 268 | 264 | 265 | 250 | 263 | 256 | 242 |
| SE2_10 | 186 | 251 | 243 | 251 | 264 | 264 | 263 | 265 | 265 | 272 | 260 | 248 | 260 | 253 | 258 | 246 |
| SE2_11 | 218 | 245 | 262 | 247 | 265 | 268 | 271 | 266 | 267 | 262 | 265 | 253 | 253 | 262 | 255 | 242 |
| SE2_12 | 215 | 241 | 250 | 245 | 266 | 273 | 272 | 265 | 263 | 262 | 263 | 255 | 259 | 260 | 262 | 246 |
| SE2_13 | 200 | 240 | 238 | 243 | 259 | 257 | 266 | 269 | 265 | 260 | 251 | 248 | 260 | 259 | 260 | 242 |
| SE2_14 | 119 | 239 | 253 | 241 | 257 | 258 | 267 | 268 | 260 | 261 | 247 | 251 | 259 | 259 | 260 | 241 |
| SE2_15 | 0 | 149 | 139 | 123 | 204 | 190 | 202 | 131 | 127 | 151 | 173 | 207 | 215 | 215 | 211 | 205 |
| SE2_16 | 3 | 36 | 32 | 36 | 91 | 93 | 81 | 41 | 37 | 49 | 59 | 208 | 120 | 120 | 138 | 112 |
| SE2_17 | 18 | 17 | 9 | 19 | 35 | 37 | 29 | 14 | 16 | 20 | 26 | 64 | 33 | 33 | 27 | 76 |
| SE2_18 | 44 | 1 | -3 | 4 | 24 | 16 | 16 | 6 | 2 | 14 | 14 | 25 | 17 | 17 | 11 | 9 |
| SE2_19 | 9 | -2 | -2 | 3 | 16 | 10 | 10 | -3 | 3 | 5 | 9 | 11 | 2 | 2 | 8 | 3 |
| SE2_20 | 17 | 1 | -7 | 3 | 9 | 5 | 5 | -4 | -2 | 2 | 4 | 10 | 3 | 3 | 7 | 1 |
| SE2_21 | 28 | -3 | -7 | 1 | 7 | 5 | 5 | -1 | -3 | 3 | 3 | 3 | 4 | 4 | 18 | -5 |
| SE2_22 | 16 | -5 | -9 | 33 | 0 | 4 | 4 | -7 | -1 | 3 | 9 | 2 | 7 | 7 | 69 | 0 |

\<Variation in capacitance before compensation\>

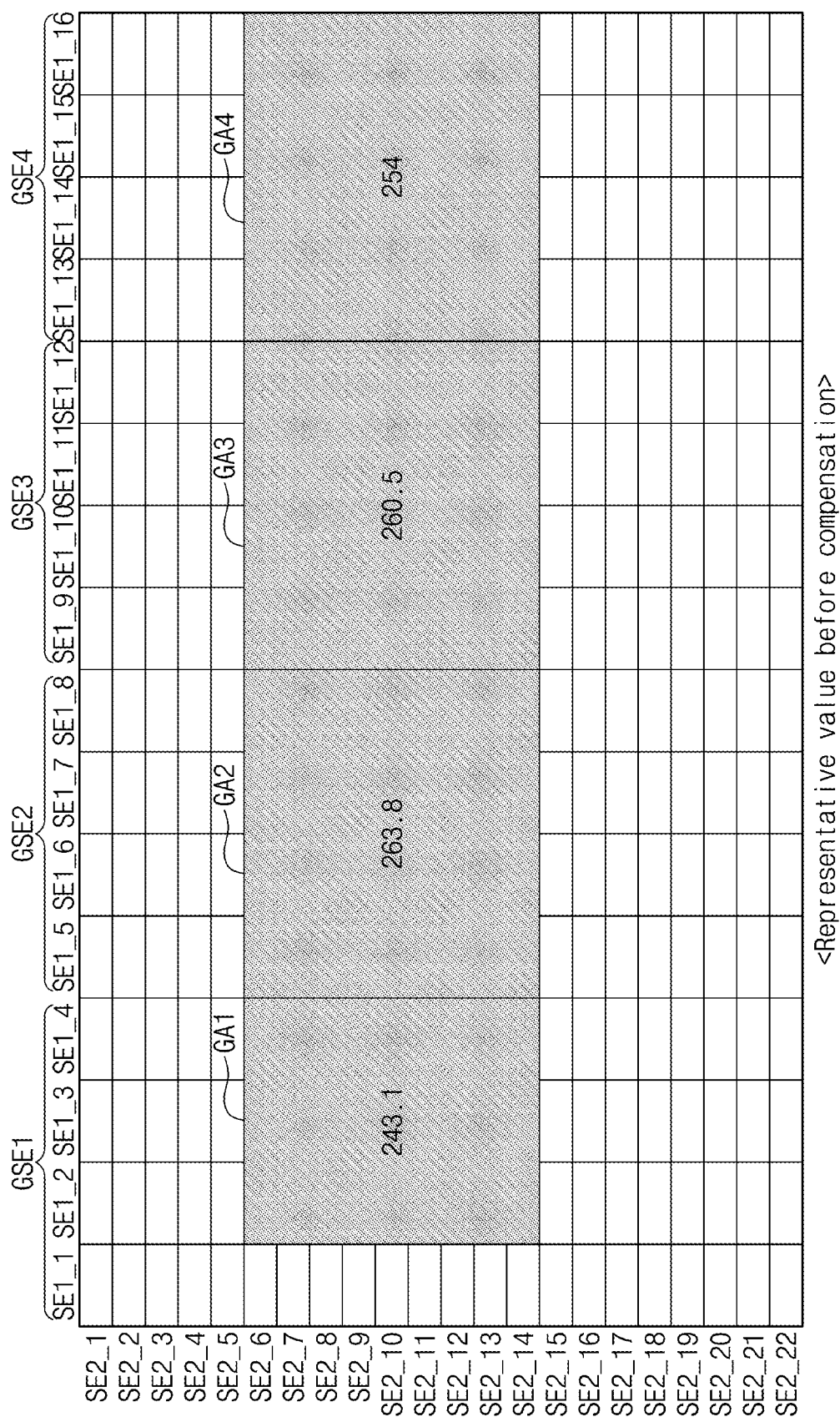

<Representative value after compensation>

FIG. 11A

<Variation in capacitance after compensation>

DISPLAY DEVICE AND METHOD OF DRIVING THE SAME

CROSS-REFERENCE TO RELATED APPLICATION

This application claims priority from and the benefit of Korean Patent Application No. 10-2020-0126457, filed on Sep. 29, 2020, which is hereby incorporated by reference for all purposes as if fully set forth herein.

BACKGROUND

Field

Embodiments of the invention relate generally to a display device and a method of driving the same. More particularly, the present disclosure relates to a display device including an input sensor and a method of driving the display device.

Discussion of the Background

Multimedia electronic devices, such as televisions, mobile phones, tablet computers, navigation units, and game units, include a display device to display images. The electronic devices include an input sensor that provides a touch-based input method allowing users to easily and intuitively input information or commands in addition to the usual input methods, such as a button, a keyboard, a mouse, etc.

The input sensor is included in the display device and senses a touch position touched by a user's body.

The above information disclosed in this Background section is only for understanding of the background of the inventive concepts, and, therefore, it may contain information that does not constitute prior art.

SUMMARY

The present disclosure provides a display device capable of preventing biometric information from being distorted due to a difference in capacitance between areas of the display device when the biometric information of a user are measured using an input sensor.

Embodiments of the inventive concepts provide a display device including a display panel displaying an image, an input sensor disposed on the display panel, and a controller electrically connected to the input sensor.

Additional features of the inventive concepts will be set forth in the description which follows, and in part will be apparent from the description, or may be learned by practice of the inventive concepts.

According to one or more embodiments, an input sensor includes a transmission electrode and a reception electrode electrically insulated from the transmission electrode. The controller is electrically connected to the transmission and reception electrodes and is configured to transmit a scan signal to the transmission electrode. The controller is operated in a first mode to sense a position at which a first external input is generated, and in a second mode to measure biometric information with respect to a second external input. The controller senses, when operated in the first mode, the position based on a first mode sensing signal to which a variation in capacitance between the transmission electrode and the reception electrode by the first external input is reflected. The controller is configured to compensate, when operated in the second mode, for a second mode sensing signal to which a variation in capacitance between the transmission electrode and the reception electrode by the second external input is reflected based on a compensation value to generate a compensation sensing signal, and the controller is configured to measure, when operated in the second mode, the biometric information based on the compensation sensing signal.

The biometric information may be a moisture level.

The transmission electrode may include m transmission electrodes, the reception electrode includes n reception electrodes, each m and n" being an integer value equal to or greater than 1r.

The transmission electrode may include m transmission electrodes, the reception electrode includes n reception electrodes, m and n being each an integer value equal to or greater than 1.

The m transmission electrodes may be grouped into a plurality of transmission electrode groups each including k transmission electrodes, where k is an integer value smaller than m. The controller may transmit, at substantially the same time the scan signal to the k transmission electrodes included in each transmission electrode group among the plurality of transmission electrode groups.

The controller may include an extractor configured to generate a representative value with respect to each of the plurality of transmission electrode groups based on the second mode sensing signal, a calculator generating the compensation value with respect to each of the plurality of transmission electrode groups based on the representative value, and a compensator configured to compensate for the representative value based on the compensation value to generate the compensation sensing signal.

The controller may include a calculator configured to generate the compensation value with respect to each of the plurality of transmission electrode groups based on the second mode sensing signal and a compensator compensating for the second mode sensing signal based on the compensation value to generate the compensation sensing signal.

The controller may further include an extractor configured to generate a representative value with respect to each of the plurality of transmission electrode groups based on the compensation sensing signal.

Them transmission electrodes may be grouped into a plurality of transmission electrode groups each including k transmission electrodes while being driven in a first multi-channel driving method, and the m transmission electrodes are grouped into a plurality of transmission electrode groups each including j transmission electrodes while being driven in a second multi-channel driving method. Each of TB k and j is an integer value smaller than m, and k and j are integer values different from each other.

The controller may transmit, at substantially the same time, the scan signal to the k transmission electrodes included in each transmission electrode group among the plurality of transmission electrode groups while being driven in the first multi-channel driving method, and the controller substantially simultaneously transmits the scan signal to the j transmission electrodes included in each transmission electrode group among the plurality of transmission electrode groups while being driven in the second multi-channel driving method.

The display panel may include a display element layer including a light emitting element and an encapsulation layer disposed on the display element layer.

The input sensor may be disposed directly on the encapsulation layer.

The display device may further include an adhesive film disposed between the display panel and the input sensor.

Another one or more embodiments provide a method of driving a display device including a display panel displaying an image, an input sensor disposed on the display panel and including a transmission electrode and a reception electrode electrically insulated from the transmission electrode, and a controller electrically connected to the input sensor, electrically connected to the transmission and reception electrodes, transmitting a scan signal to the transmission electrode, and operated in a first mode to sense a position at which a first external input is generated or in a second mode to measure biometric information with respect to a second external input. The method includes selecting the first mode or the second mode, sensing, when in the first mode, the position based on a first mode sensing signal to which a variation in capacitance between the transmission electrode and the reception electrode by the first external input is reflected, compensating, when in the second mode, for a second mode sensing signal to which a variation in capacitance between the transmission electrode and the reception electrode by the second external input is reflected based on a compensation value to generate a compensation sensing signal, and measuring, when in the second mode, the biometric information based on the compensation sensing signal.

The biometric information may be a moisture level.

The transmission electrode may include m transmission electrodes, the reception electrode includes n reception electrodes, each of m and n is an integer value equal to or greater than 1.

The m transmission electrodes may be grouped into a plurality of transmission electrode groups each including k transmission electrodes, the controller substantially simultaneously transmits the scan signal to the k transmission electrodes included in each transmission electrode group among the plurality of transmission electrode groups, where k is an integer value smaller than m.

The generating of the compensation sensing signal may include generating a representative value with respect to each of the plurality of transmission electrode groups based on the second mode sensing signal, generating the compensation value with respect to each of the plurality of transmission electrode groups based on the representative value, and compensating for the representative value based on the compensation value to generate the compensation sensing signal.

The generating of the compensation sensing signal may include generating the compensation value with respect to each of the plurality of transmission electrode groups based on the second mode sensing signal and compensating for the second mode sensing signal based on the compensation value to generate the compensation sensing signal.

The measuring of the biometric information may include generating the representative value with respect to each of the plurality of transmission electrode groups based on the compensation sensing signal.

The m transmission electrodes may be grouped into a plurality of transmission electrode groups each including k transmission electrodes while being driven in a first multi-channel driving method, and the m transmission electrodes are grouped into a plurality of transmission electrode groups each including j transmission electrodes while being driven in a second multi-channel driving method. The controller substantially simultaneously transmits the scan signal to the k transmission electrodes included in each transmission electrode group among the plurality of transmission electrode groups while being driven in the first multi-channel driving method and substantially simultaneously transmits the scan signal to the j transmission electrodes included in each transmission electrode group among the plurality of transmission electrode groups while being driven in the second multi-channel driving method. Each of k and j is an integer value smaller than m, and k and j are integer values different from each other.

According to the above, a difference in capacitance between areas of the display device is reduced.

Thus, the distortion of the biometric information due to the difference in capacitance between areas of the display device is prevented when measuring the biometric information of a user. In addition, a difference in capacitance between multi-channels is compensated for even though the input sensor is driven in the multi-channel driving method. Accordingly, the biometric information of the user is measured without distortion through the input sensor included in the display device.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 6B is a timing diagram showing an operation of the input sensor shown in FIG. 6A.

FIG. 7B is a timing diagram showing an operation of the input sensor shown in FIG. 7A.

FIG. 9A is a table showing a variation in capacitance before compensation by a second external input according to a position on a display device.

FIG. 10A is a table showing a representative value, which is generated based on a second mode sensing signal, before the compensation according to a position on the display device.

FIG. 11A is a table showing a variation in capacitance after the compensation, which is obtained by compensating for the variation in capacitance before the compensation shown in FIG. 9A based on the compensation value, according to the position.

DETAILED DESCRIPTION

Figure 1:
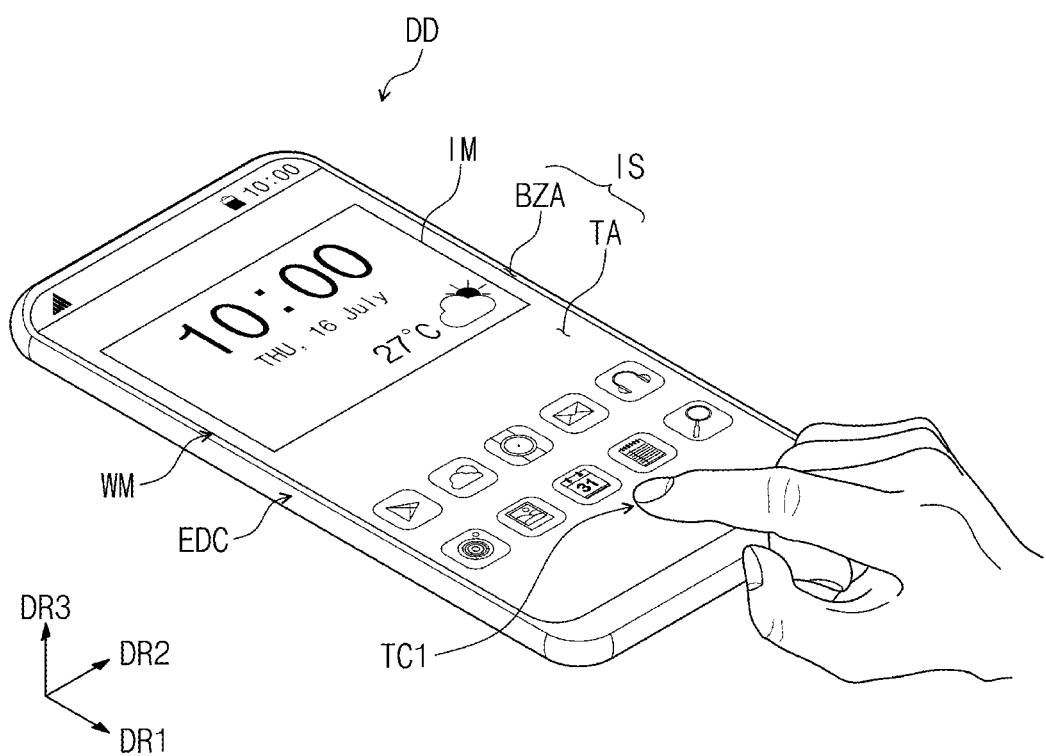
FIG. 1 is a perspective view showing a display device according to an embodiment that is constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless otherwise specified. Further, in the accompanying drawings, the size and relative sizes of elements may be exaggerated for clarity and/or descriptive purposes. When an embodiment may be implemented differently, a specific process may be performed in an order different from the described order. For example, two consecutively described processes may be performed substantially at the same time or performed in an order opposite to the described order. Also, like reference numerals denote like elements.

When an element or a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, one or more embodiments will be explained in detail with reference to the accompanying drawings.

Figure 2:
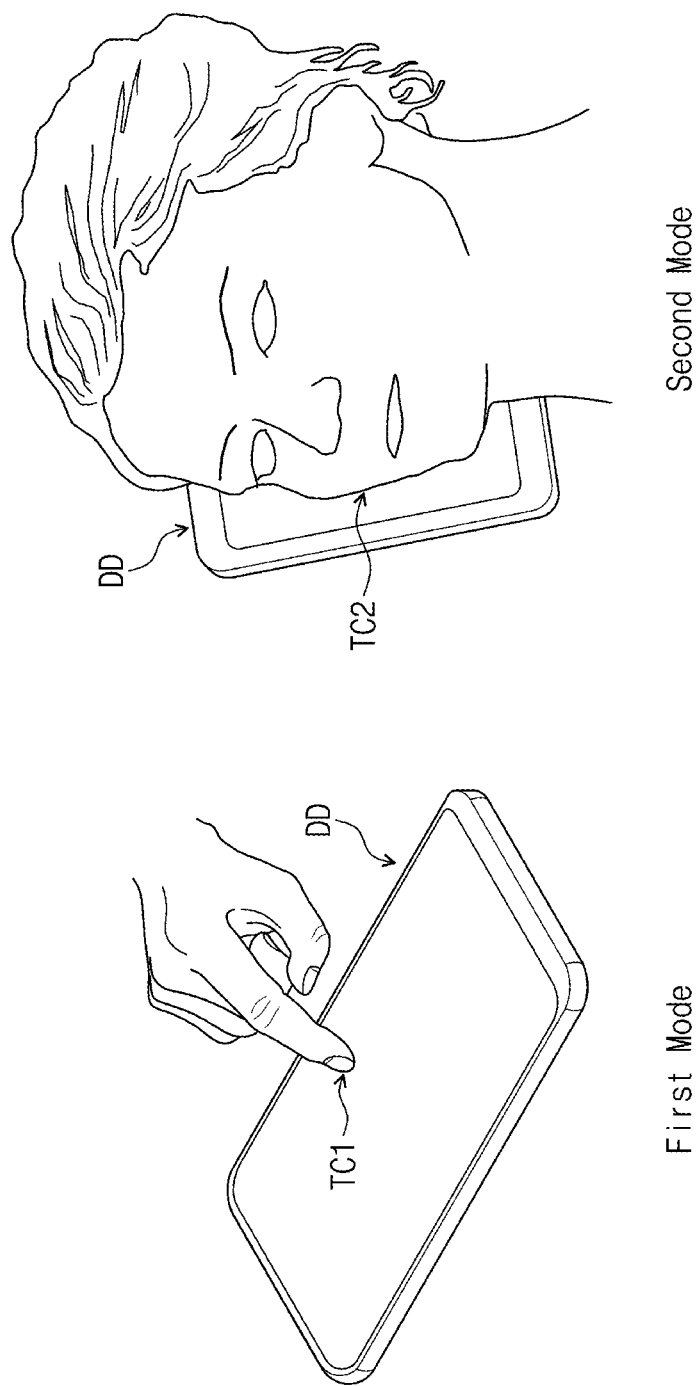
FIG. 2 is a view showing an operation mode of a display device according to an embodiment.
Figure 3:
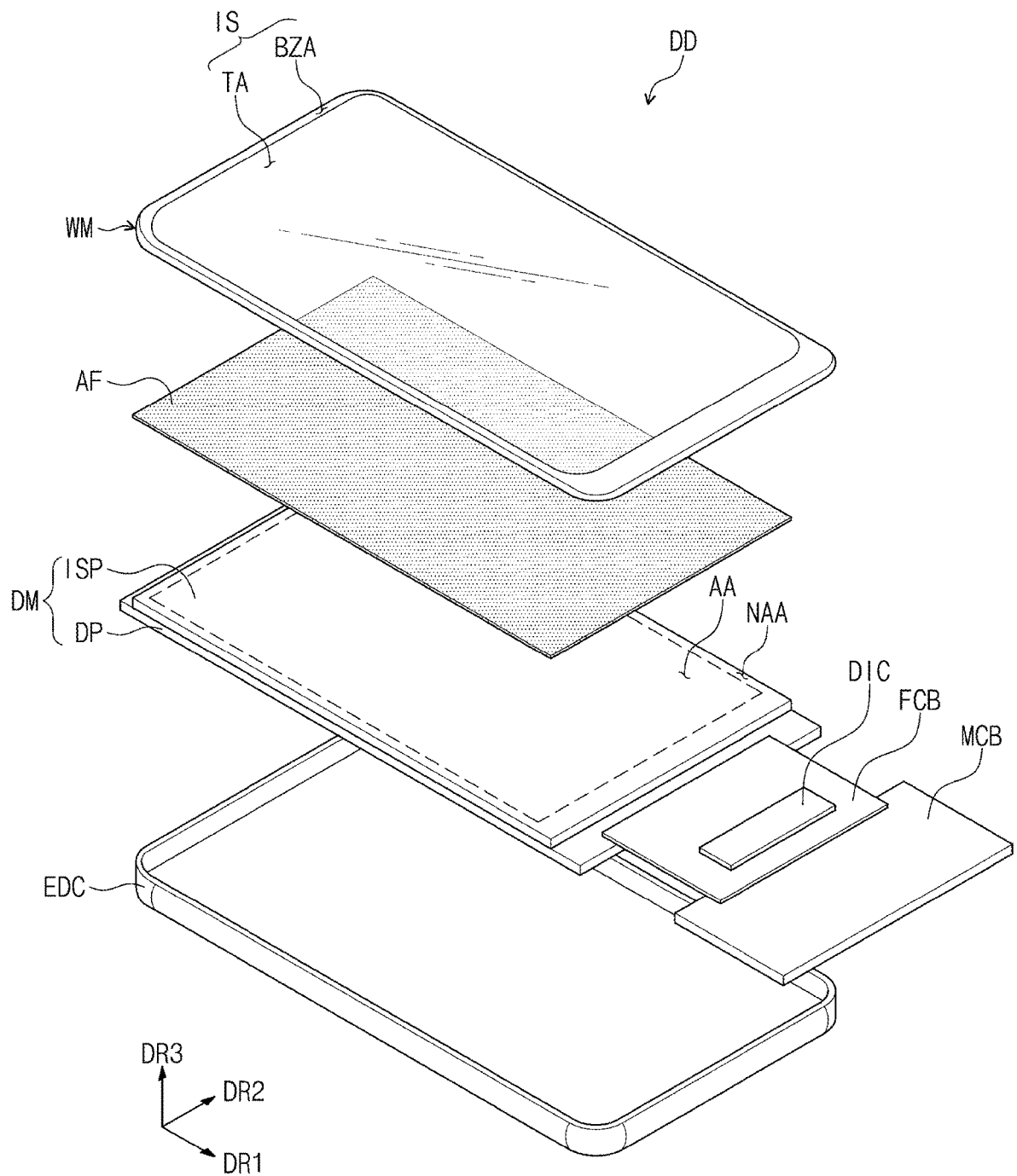
FIG. 3 is an exploded perspective view showing a display device according to an embodiment.

FIG. 1 is a perspective view showing a display device DD according to an embodiment that is constructed according to principles of the invention. FIG. 2 is a view showing an operation mode of the display device DD according to an embodiment. FIG. 3 is an exploded perspective view showing the display device DD according to an embodiment.

Referring to FIGS. 1 to 3, the display device DD may have a rectangular shape with long sides extending in a first direction DR1 and short sides extending in a second direction DR2 crossing the first direction DR1. However, the shape of the display device DD is not limited thereto or thereby, and the display device DD may have any one of a variety of shapes.

The display device DD may be a large-sized display device, such as a television set, a monitor, or the like, or a small- or medium-sized display device, such as a mobile phone, a tablet computer, a car navigation unit, a game unit, or the like. However, these are merely examples, and the display device DD may be employed in other electronic items as long as they do not depart from the inventive concepts as described herein with respect to various embodiments.

The display device DD may display an image IM toward a third direction DR3 through a display surface IS that is substantially parallel to each of the first direction DR1 and the second direction DR2. The display surface IS through which the image IM is displayed may correspond to a front surface of the display device DD. The image IM may include a video and a still image.

In present embodiment described herein, front (or upper) and rear (or lower) surfaces of each member are defined with respect to the third direction DR3 in which the image IM is displayed. The front and rear surfaces are opposite to each other in the third direction DR3, and a normal line direction of each of the front and rear surfaces may be substantially parallel to the third direction DR3.

Directions indicated by the first, second, and third directions DR1, DR2, and DR3 are relative to each other and may be changed in other directions.

The display device DD may sense an external input applied thereto from the outside. The external input includes various forms of inputs provided from the outside of the display device DD. The display device DD according to the embodiment may sense a first external input TC1 applied thereto from the outside in a first mode. The first external input TC1 may be one of various forms of external inputs, such as a portion of the user's body, light, heat, or pressure, or a combination thereof. In addition, the first external input TC1 may be an input generated by an input device, e.g., a stylus pen, an active pen, a touch pen, an electronic pen, or the like, in addition to a user's hand. In the present embodiment, the first external input TC1 is shown as a touch input by the user's hand applied to the front surface. However, this is merely an example, and the first external input TC1 may be provided in various forms as described above. In addition, the display device DD may sense the first external input TC1, which is applied to a side or rear surface of the display device DD depending on a structure of the display device DD, and this embodiment is not limited to this particular implementation. The display device DD may obtain position information, e.g., coordinate information, of the first external input TC1 in the first mode.

In addition, the display device DD according to the embodiment may sense a second external input TC2 applied thereto from the outside in a second mode. The second external input TC2 may be a touch input by the user's hand like the first external input TC1 or a touch input by a user's body part other than the user's hand, e.g., a face, a forearm, a calf, a thigh, etc. In the embodiment as described herein, the second external input TC2 is described as a touch input by a user's face applied to the front surface, however, this is merely an example. As described above, the second external input TC2 may be provided in various forms. In addition, the display device DD may sense the second external input TC2, which is applied to the side or rear surface of the display device DD depending on the structure of the display device DD, and this embodiment is not limited to this particular implementation. The display device DD may measure biometric information of the user in response to the second external input TC2 in the second mode.

The front surface of the display device DD may include a transmission area TA and a bezel area BZA. The transmission area TA may be an area through which the image IM is displayed. The user may view the image IM through the transmission area TA. In the present embodiment, the transmission area TA may have a quadrangular shape with rounded vertices, however, this is merely an example. The transmission area TA may have a variety of shapes and is not particularly limited.

The bezel area BZA may be defined adjacent to the transmission area TA. The bezel area BZA may have a predetermined color. The bezel area BZA may surround the transmission area TA. Accordingly, the transmission area TA may have a shape that is defined by the bezel area BZA. However, this is merely an example, and the bezel area BZA may be disposed adjacent to only one side of the transmission area TA or omitted in alternative implementations. The display device DD according to the embodiment may include various alternative implementations and is not particularly limited.

As shown in FIG. 3, the display device DD may include a display module DM and a window WM disposed on the display module DM. The display module DM may include a display panel DP and an input sensor ISP.

The display panel DP according to the embodiment of the present disclosure may be a light-emitting type display panel, however, it is not particularly limited. For instance, the display panel DP may be an organic light emitting display panel or a quantum dot light emitting display panel. A light emitting element of the organic light emitting display panel may include an organic light emitting material. A light emitting element of the quantum dot light emitting display panel may include a quantum dot or a quantum rod. Hereinafter, the organic light emitting display panel will be described as a representative example of the display panel DP. The display panel DP may output the image IM, and the output image may be displayed through the display surface IS.

In FIGS. 1 and 3, the display device DD has a flat structure, however, this embodiment is not limited thereto or thereby. The display device DD may be bent or folded about a folding axis or may have a slidable structure.

The input sensor ISP may obtain the coordinate information of the first external input TC1 in the first mode and may measure the biometric information on the second external input TC2 in the second mode.

The window WM may include a transparent material that transmits the image IM. For example, the window WM may include a glass, sapphire, or plastic material. The window WM may have a single-layer structure, however, it is not limited thereto or thereby, and the window WM may include a plurality of layers.

The bezel area BZA of the display device DD may be defined by printing a material having a predetermined color on an area of the window WM. As an example, the window WM may include a light blocking pattern to define the bezel area BZA. The light blocking pattern may be a colored organic layer and may be formed by a coating method.

The window WM may be coupled to the display module DM by an adhesive film AF. As an example, the adhesive film AF may include an optically clear adhesive film (OCA). However, the adhesive film AF is not limited thereto or thereby, and the adhesive film AF may include a conventional adhesive. For example, the adhesive film AF may include an optically clear resin (OCR) or a pressure sensitive adhesive film (PSA).

An anti-reflective layer may be further disposed between the window WM and the display module DM. The anti-reflective layer may reduce a reflectance of an external light incident thereto from the above of the window WM. The anti-reflective layer according to the embodiment may include a retarder and a polarizer. The retarder may be a film type or liquid crystal coating type and may include a λ/2 retarder and/or a λ/4 retarder. The polarizer may be a film type or liquid crystal coating type. The film type polarizer may include a stretching type synthetic resin film, and the liquid crystal coating type polarizer may include liquid crystals aligned in a predetermined alignment. The retarder and the polarizer may be implemented as one polarizing film.

The display module DM may display the image in response to electrical signals and may transmit/receive information about the external input. The display module DM may include an active area AA and a peripheral area NAA. The active area AA may be defined as an area through which the image provided from the display module DM transmits.

The peripheral area NAA may be defined adjacent to the active area AA. For example, the peripheral area NAA may surround the active area AA. However, this is merely an example, and the peripheral area NAA may be defined in various shapes and is not particularly limited. According to an embodiment, the active area AA of the display module DM may correspond to at least a portion of the transmission area TA.

The display module DM may further include a main circuit board MCB, a flexible circuit film FCB, and a driving chip DIC. The main circuit board MCB may be connected to the flexible circuit film FCB and may be electrically connected to the display panel DP. The flexible circuit film FCB may be connected to the display panel DP and may electrically connect the display panel DP to the main circuit board MCB. The input sensor ISP may be electrically connected to the main circuit board MCB via the flexible circuit film FCB, however, the embodiment described herein is not limited thereto or thereby. That is, the display module DM may further include a separate flexible circuit film to electrically connect the input sensor ISP to the main circuit board MCB.

The main circuit board MCB may include a plurality of driving elements. The driving elements may include a circuit to drive the display panel DP. The driving chip DIC may be mounted on the flexible circuit film FCB. However, the embodiment described herein is not limited thereto or thereby. For example, the driving chip DIC may be directly mounted on the display panel DP. In this case, a portion of the display panel DP on which the driving chip DIC is mounted may be bent to be disposed on a rear surface of the display module DM. The driving chip DIC may include driving elements, for example, a data driving circuit, to drive a pixel of the display panel DP.

The display module DM may further include a controller CTR (refer to FIG. 6A) to control a drive of the input sensor ISP. That is, the controller CTR may be mounted on the main circuit board MCB. However, the controller CTR may be built in the driving chip DIC according to another embodiment.

The display device DD may further include an external case EDC that accommodates the display module DM. The external case EDC may be coupled to the window WM to define an exterior of the display device DD. The external case EDC may absorb impacts applied thereto from the outside and may prevent a foreign substance and moisture from entering the display module DM to protect components accommodated in the external case EDC. Meanwhile, as an example, the external case EDC may be provided in a form obtained by coupling a plurality of accommodating members.

The display device DD according to the embodiment may further include an electronic module including a variety of functional modules to drive the display module DM, a power supply module supplying a power required for an overall operation of the display device DD, and a bracket coupled to the display module DM and/or the external case EDC to divide an inner space of the display device DD.

Figure 4:
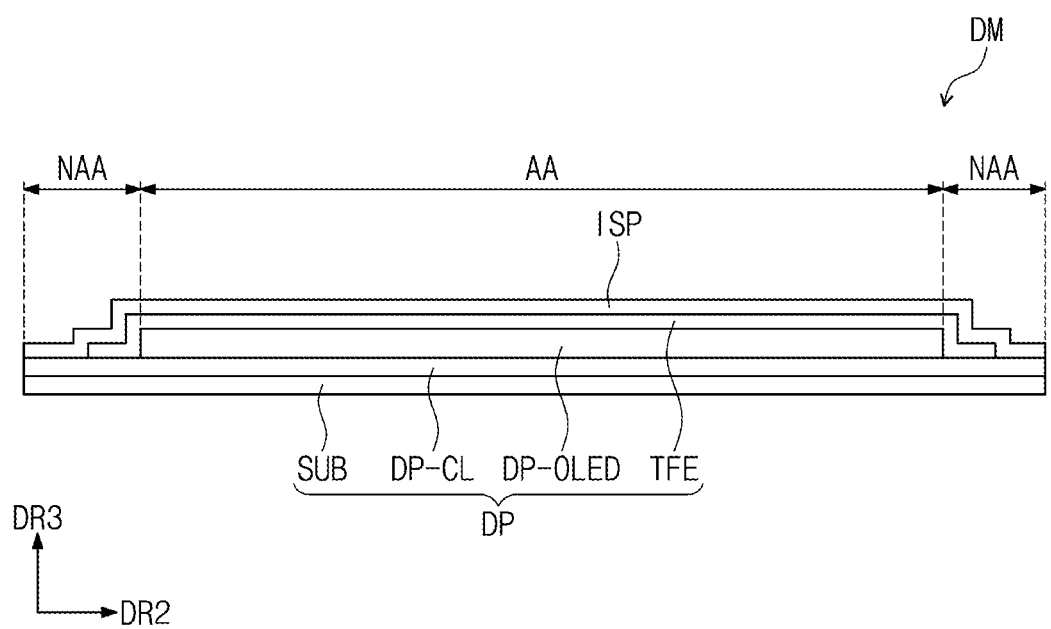
FIG. 4 is a cross-sectional view showing a display module according to an embodiment.

FIG. 4 is a cross-sectional view showing the display module DM according to an embodiment.

Referring to FIG. 4, the display module DM may include the display panel DP and the input sensor ISP. The display panel DP may include a base layer SUB, a circuit element layer DP-CL, a display element layer DP-OLED, and a thin film encapsulation layer TFE, and the circuit element layer DP-CL, the display element layer DP-OLED, and the thin film encapsulation layer TFE may disposed on the base layer SUB. The display panel DP may further include functional layers such as an anti-reflective layer, a refractive index control layer, or the like.

The base layer SUB may include at least one plastic film. The base layer SUB may include a plastic substrate, a glass substrate, a metal substrate, or an organic/inorganic composite substrate as a flexible substrate. The active area AA and the peripheral area NAA, which are described with reference to FIG. 3, may be defined in the base layer SUB.

The circuit element layer DP-CL may include at least one intermediate insulating layer and a circuit element. The intermediate insulating layer may include at least one intermediate inorganic layer and at least one intermediate organic layer. The circuit element may include signal lines and a driving circuit of the pixel.

The display element layer DP-OLED may include a light emitting element. The light emitting element may include at least organic light emitting diodes. The display element layer DP-OLED may further include an organic layer such as a pixel definition layer.

The thin film encapsulation layer TFE may encapsulate the display element layer DP-OLED. The thin film encapsulation layer TFE may include at least one inorganic layer (hereinafter, referred to as an encapsulation inorganic layer). The thin film encapsulation layer TFE may include at least one organic layer (hereinafter, referred to as an encapsulation organic layer). The encapsulation inorganic layer may protect the display element layer DP-OLED from moisture and oxygen, and the encapsulation organic layer may protect the display element layer DP-OLED from a foreign substance, such as dust particles. The encapsulation inorganic layer may include a silicon nitride layer, a silicon oxynitride layer, a silicon oxide layer, a titanium oxide layer, or an aluminum oxide layer. The encapsulation organic layer may include an acrylic-based organic layer, however, it is not limited thereto or thereby.

The input sensor ISP may be formed on the display panel DP through successive processes. In addition, the input sensor ISP and the display panel DP may be coupled to each other by an adhesive film. The input sensor ISP may have a multi-layer structure. The input sensor ISP may include an insulating layer having a single-layer or multi-layer structure. According to the embodiment described herein, in a case where the input sensor ISP is disposed directly on the display panel DP through successive processes, the input sensor ISP may be disposed directly on the thin film encapsulation layer TFE, and an adhesive film may not be disposed between the input sensor ISP and the display panel DP. According to another embodiment, the adhesive film may be disposed between the input sensor ISP and the display panel DP. In this case, the input sensor ISP may not be formed through the successive processes with the display panel DP and may be fixed on an upper surface of the display panel DP by the adhesive film after being formed through a separate process from the display panel DP.

The input sensor ISP may obtain the coordinate information of the first external input TC1 in the first mode and may measure the biometric information in response to the second external input TC2 in the second mode by using a capacitance method.

Figure 5:
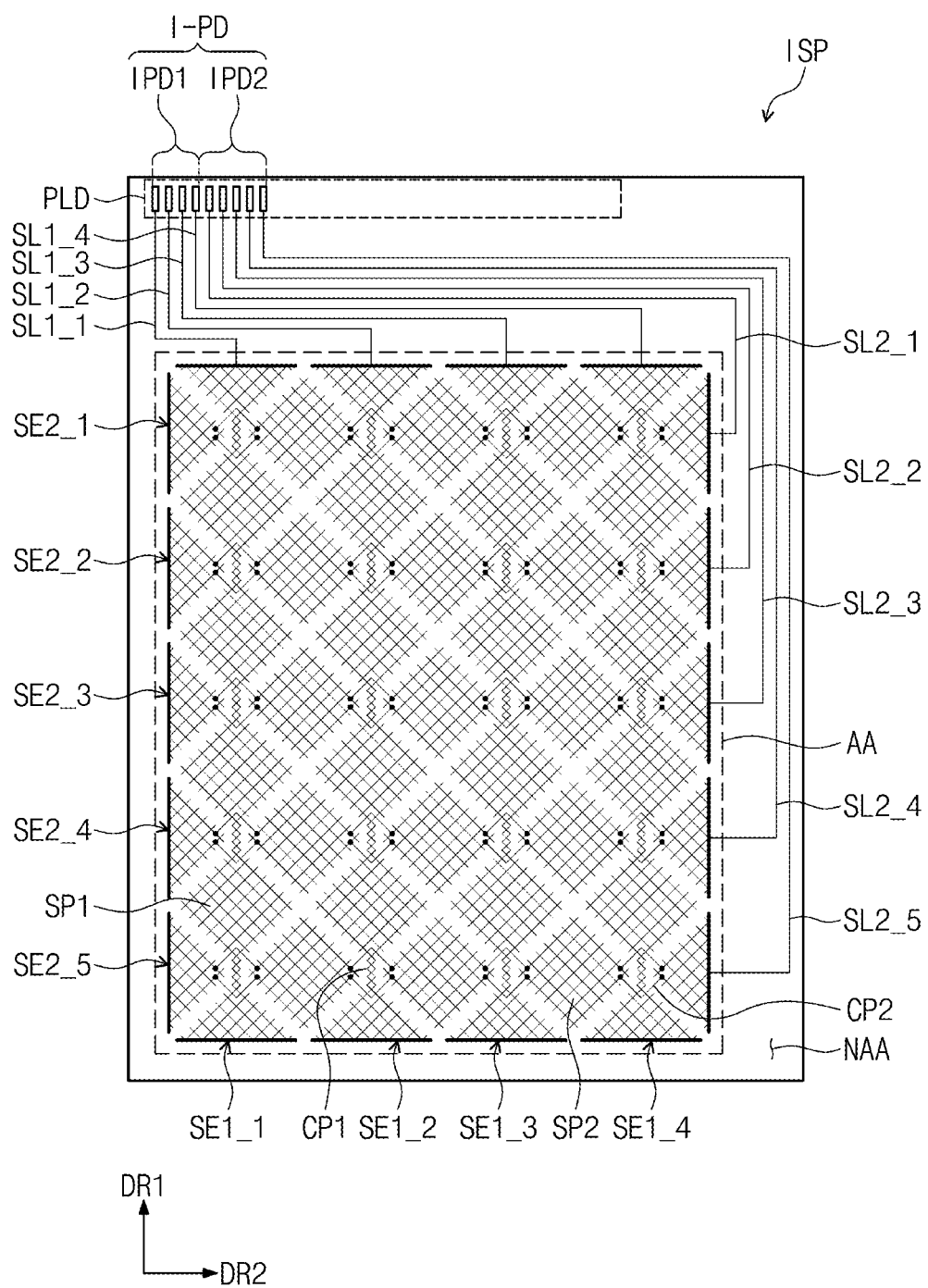
FIG. 5 is a plan view showing an input sensor according to an embodiment.

FIG. 5 is a plan view showing the input sensor ISP according to an embodiment.

Referring to FIG. 5, the input sensor ISP may include transmission electrodes SE1_1 to SE1_4 and reception electrodes SE2_1 to SE2_5. The input sensor ISP may further include first tracing lines SL1_1 to SL1_4 connected to one ends of the transmission electrodes SE1_1 to SE1_4 and second tracing lines SL2_1 to SL2_5 connected to one ends of the reception electrodes SE2_1 to SE2_5.

The transmission electrodes SE1_1 to SE1_4 may cross the reception electrodes SE2_1 to SE2_5. A capacitor may be formed between the transmission electrodes SE1_1 to SE1_4 and the reception electrodes SE2_1 to SE2_5. A capacitance of the capacitor may be changed by the first external input TC1 (refer to FIG. 2) or the second external input TC2 (refer to FIG. 2).

Each of the transmission electrodes SE1_1 to SE1_4 may include first sensor parts SP1 and first connection parts CP1 disposed in the active area AA. Each of the reception electrodes SE2_1 to SE2_5 may include second sensor parts SP2 and second connection parts CP2 disposed in the active area AA.

As an example, FIG. 5 shows four transmission electrodes SE1_1 to SE1_4 and five reception electrodes SE2_1 to SE2_5, however, the embodiment described herein is not limited thereto or thereby. The transmission electrodes may include m transmission electrodes, and the reception electrodes may include n reception electrodes. In the present embodiment, each of "m" and "n" is an integer (i.e., a natural number) equal to or greater than 1, and "m" and "n" may be the same as each other or different from each other.

In FIG. 5, the first sensor parts SP1 and the second sensor parts SP2 have a lozenge shape, however, they are not limited thereto or thereby. That is, the first sensor parts SP1 and the second sensor parts SP2 may have a different polygonal shape.

In one transmission electrode, the first sensor parts SP1 may be arranged in the first direction DR1, and in one reception electrode, the second sensor parts SP2 may be arranged in the second direction DR2. Each of the first connection parts CP1 may electrically connect the first sensor parts SP1 adjacent to each other, and the second connection parts CP2 may electrically connect the second sensor parts SP2 adjacent to each other.

The transmission electrodes SE1_1 to SE1_4 and the reception electrodes SE2_1 to SE2_5 may have a mesh shape. As the transmission electrodes SE1_1 to SE1_4 and the reception electrodes SE2_1 to SE2_5 have the mesh shape, a capacitance of a parasitic capacitor formed between the electrodes of the display panel DP (refer to FIG. 4) and the transmission electrodes SE1_1 to SE1_4 and the reception electrodes SE2_1 to SE2_5 may be reduced.

The transmission electrodes SE1_1 to SE1_4 and the reception electrodes SE2_1 to SE2_5, which have the mesh shape, may include silver (Ag), aluminum (Al), copper (Cu), chromium (Cr), nickel (Ni), titanium (Ti), etc., to which a low-temperature process may be applied. As the transmission electrodes SE1_1 to SE1_4 and the reception electrodes SE2_1 to SE2_5 are formed of materials to which a low-temperature process may be applied, the organic light emitting diodes included in the display panel DP may be prevented from being damaged even though the input sensor ISP is formed through the successive processes. However, the transmission electrodes SE1_1 to SE1_4 and the reception electrodes SE2_1 to SE2_5 may include a variety of materials in addition to the above-mentioned materials.

The first tracing lines SL1_1 to SL1_4 may be respectively connected to one ends of the transmission electrodes SE1_1 to SE1_4. In the embodiment of the present disclosure, the input sensor ISP may further include tracing lines connected to the other ends of the transmission electrodes SE1_1 to SE1_4. The second tracing lines SL2_1 to SL2_5 may be respectively connected to one ends of the reception electrodes SE2_1 to SE2_5. In the embodiment described herein, the input sensor ISP may further include tracing lines connected to the other ends of the reception electrodes SE2_1 to SE2_5.

The first tracing lines SL1_1 to SL1_4 and the second tracing lines SL2_1 to SL2_5 may be disposed in the peripheral area NAA.

The input sensor ISP may further include a pad part PLD disposed in the peripheral area NAA. The pad part PLD may be connected to the flexible circuit film FCB (refer to FIG. 3) and may include input pads I-PD to connect the flexible circuit film FCB to the input sensor ISP. The input pads I-PD may include first input pads IPD1 connected to the first tracing lines SL1_1 to SL1_4 and second input pads IPD2 connected to the second tracing lines SL2_1 to SL2_5.

Figure 6A:
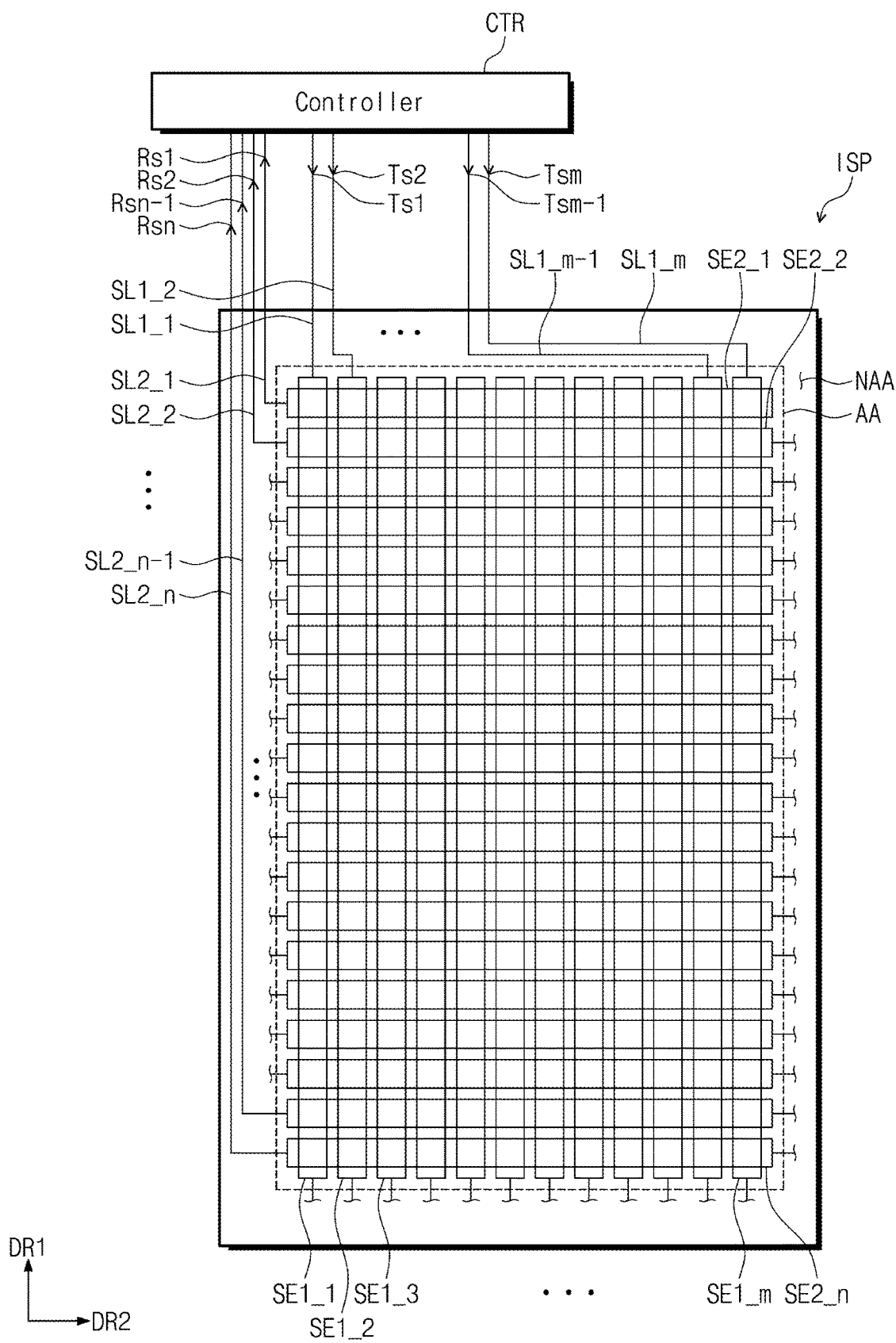
FIG. 6A is a block diagram showing a controller and an input sensor according to an embodiment.

FIG. 6A is a block diagram showing the controller CTR and the input sensor ISP according to an embodiment, and FIG. 6B is a timing diagram showing an operation of the input sensor ISP shown in FIG. 6A.

FIG. 6A shows a structure in which each of transmission and reception electrodes SE1_1 to SE1_$m$ and SE2_1 to SE2_$n$ has a bar (i.e., rectangular) shape, however, the embodiment described herein is not limited thereto or thereby. For example, the transmission and reception electrodes SE1_1 to SE1_$m$ and SE2_1 to SE2_$n$ may include a plurality of mesh lines as shown in FIG. 5.

Hereinafter, detailed descriptions of the same elements as those of FIG. 5 will be omitted for sake of brevity.

Referring to FIG. 6A, the input sensor ISP may include the transmission electrodes SE1_1 to SE1_$m$ and the reception electrodes SE2_1 to SE2_$n$. The transmission electrodes SE1_1 to SE1_$m$ and the reception electrodes SE2_1 to SE2_$n$ may be electrically insulated from each other while crossing each other. In the embodiment, each of "n" and "m" is an integer equal to or greater than 1. (i.e., a natural number) "n" may be greater than "m", however, it is not limited thereto or thereby. That is, "n" may be equal to or smaller than "m".

Each of the transmission electrodes SE1_1 to SE1_$m$ may extend in the first direction DR1 and may have a bar (i.e., rectangular) shape. The transmission electrodes SE1_1 to SE1_$m$ may be arranged in the second direction DR2 and spaced apart from each other. The transmission electrodes SE1_1 to SE1_$m$ may have the same electrode width as each other in the second direction DR2. The transmission electrodes SE1_1 to SE1_$m$ may be spaced apart from each other at regular intervals in the second direction DR2.

Each of the reception electrodes SE2_1 to SE2_$n$ may extend in the second direction DR2 and may have a bar (i.e., rectangular) shape. The reception electrodes SE2_1 to SE2_$n$ may be arranged in the first direction DR1 and spaced apart from each other. The reception electrodes SE2_1 to SE2_$n$ may have the same electrode width as each other in the first direction DR1. The reception electrodes SE2_1 to SE2_$n$ may be spaced apart from each other at regular intervals in the first direction DR1.

The input sensor ISP may further include first tracing lines SL1_1 to SL1_$m$ and second tracing lines SL2_1 to SL2_$n$.

The first tracing lines SL1_1 to SL1_$m$ may be electrically connected to the one ends of the transmission electrodes SE1_1 to SE1_$m$, and the second tracing lines SL2_1 to SL2_$n$ may be electrically connected to the one ends of the reception electrodes SE2_1 to SE2_$n$. As an example, the input sensor ISP may further include third tracing lines electrically connected to the other ends of the reception electrodes SE2_1 to SE2_$n$, however, the embodiment described herein is not limited thereto or thereby. That is, the third tracing lines may be omitted as an optional element of this embodiment.

Referring to FIG. 6A, the controller CTR may be electrically connected to the input sensor ISP. The controller CTR may be electrically connected to the transmission electrodes SE1_1 to SE1_$m$ and the reception electrodes SE2_1 to SE2_$n$ and may be operated in the first mode that senses the position at which the first external input TC1 (refer to FIG. 2) is generated and the second mode that measures the biometric information with respect to the second external input TC2 (refer to FIG. 2).

In the first mode, the controller CTR may sense the position of the first external input TC1 based on a sensing signal to which a variation in capacitance between the transmission electrodes SE1_1 to SE1_$m$ and the reception electrodes SE2_1 to SE2_$n$ by the first external input TC1 is reflected. In the second mode, the controller CTR may measure the biometric information with respect to the second external input TC2 based on a sensing signal to which a variation in capacitance between the transmission electrodes SE1_1 to SE1_$m$ and the reception electrodes SE2_1 to SE2_$n$ by the second external input TC2 is reflected.

The transmission electrodes SE1_1 to SE1_$m$ may be electrically connected to the controller CTR via the first tracing lines SL1_1 to SL1_$m$, and the reception electrodes SE2_1 to SE2_$n$ may be electrically connected to the controller CTR via the second tracing lines SL2_1 to SL2_$n$.

The controller CTR may transmit scan signals Ts1 to Tsm to the transmission electrodes SE1_1 to SE1_$m$ and may receive sensing signals Rs1 to Rsn to which the variation in capacitance between the transmission electrodes SE1_1 to SE1_$m$ and the reception electrodes SE2_1 to SE2_$n$ is reflected from the reception electrodes SE2_1 to SE2_$n$. In detail, the controller CTR may sequentially transmit the scan signals Ts1 to Tsm to the transmission electrodes SE1_1 to SE1_$m$, respectively. For example, the controller CTR may transmit a first scan signal Ts1 to a first transmission electrode SE1_1 and may transmit a second scan signal Ts2 to a second transmission electrode SE1_2. The controller CTR may receive the sensing signals Rs1 to Rsn from the reception electrodes SE2_1 to SE2_$n$, respectively. For example, the controller CTR may receive a first sensing signal Rs1 from a first reception electrode SE2_1 and may receive a second sensing signal Rs2 from a second reception electrode SE2_2.

Referring to FIGS. 2, 6A, and 6B, the display device DD may display the image IM (refer to FIG. 1) through the display panel DP (refer to FIG. 3). The display panel DP may display the image IM in a unit of one frame. When the display device DD displays the image IM through the display panel DP, the display device DD may sense the first external input TC1 and the second external input TC2 through the input sensor ISP. As an example, the input sensor ISP may have an operating frequency equal to, smaller than, or greater than an operating frequency of the display panel DP.

In one sensing frame 1F, the controller CTR electrically connected to the input sensor ISP may sequentially transmit the scan signals Ts1 to Tsm to the transmission electrodes SE1_1 to SE1_m.

As an example, the controller CTR may sequentially transmit first to fourth scan signals Ts1 to Ts4 to first to fourth transmission electrodes SE1_1 to SE1_4 in the one sensing frame 1F. Intervals during which the controller CTR respectively transmits the first to fourth scan signals Ts1 to Ts4 to the first to fourth transmission electrodes SE1_1 to SE1_4 may be referred to as first to fourth intervals t1 to t4, respectively. During the first interval t1, the controller CTR may transmit the first scan signal Ts1 to the first transmission electrode SE1_1.

In this case, the capacitor may be formed between each of the reception electrodes SE2_1 to SE2_n and each of the transmission electrodes SE1_1 to SE1_m. The sensing signals Rs1 to Rsn may be generated respectively in the reception electrodes SE2_1 to SE2_n by the capacitor in response to the scan signals Ts1 to Tsm. As an example, the first sensing signal Rs1 may be generated in the first reception electrode SE2_1 in response to the first scan signal Ts1 applied to the first transmission electrode SE1_1.

In the case where the first external input TC1 or the second external input TC2 is applied to the display device DD, the capacitance of the capacitor formed between the transmission electrodes and the reception electrodes may vary compared with that when the external inputs TC1 and TC2 are not applied. Accordingly, the input sensor ISP may sense the position of the first external input TC1 or may measure the biometric information of the second external input TC2 based on the variation in capacitance.

Figure 7A:
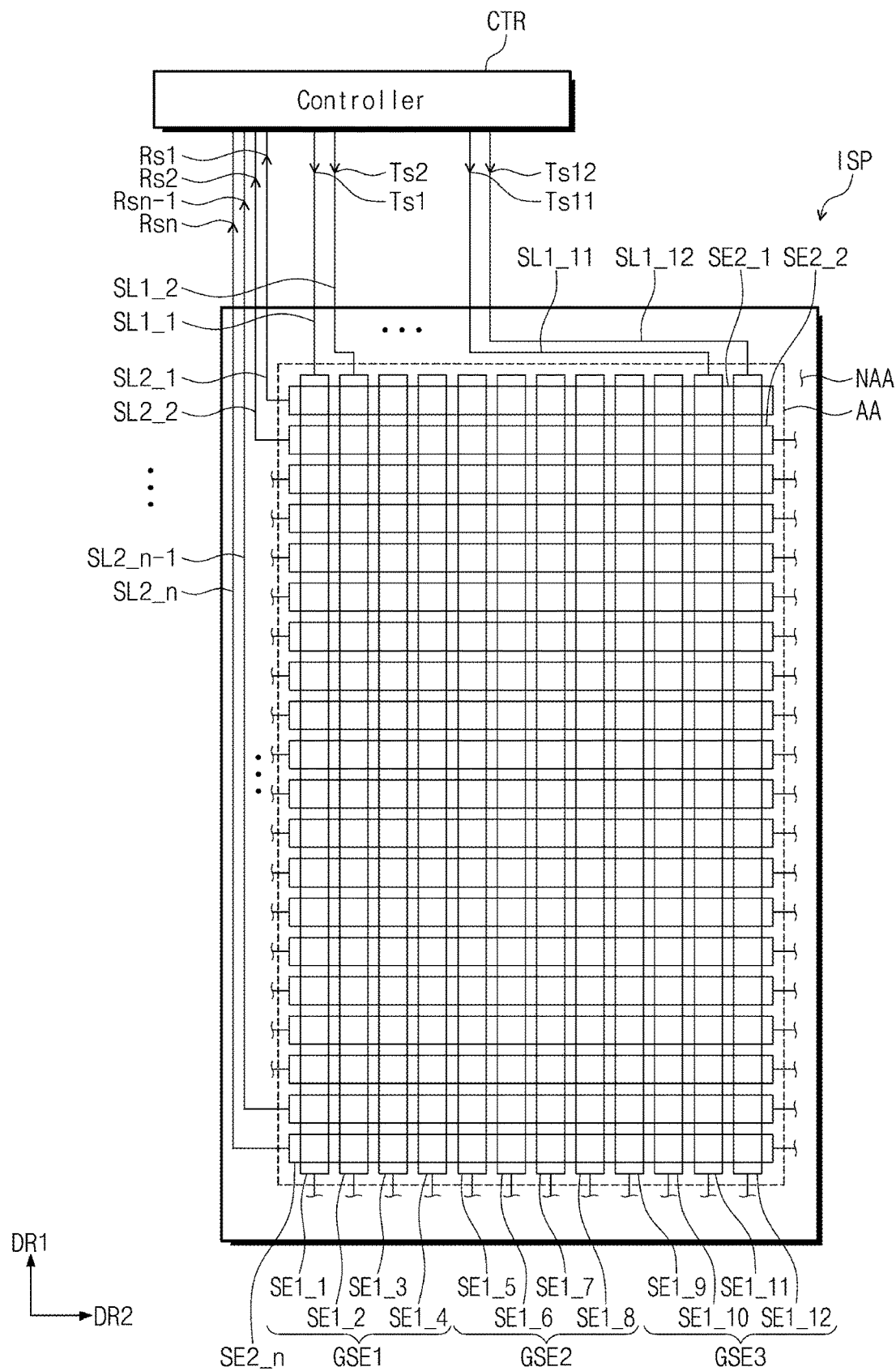
FIG. 7A is a block diagram showing a controller and an input sensor according to an embodiment.

FIG. 7A is a block diagram showing a controller CTR and an input sensor ISP according to an embodiment, and FIG. 7B is a timing diagram showing an operation of the input sensor ISP shown in FIG. 7A.

Hereinafter, detailed descriptions of the same elements as those of FIG. 6A will be omitted for sake of brevity.

Referring to FIG. 7A, the input sensor ISP may include transmission electrodes SE1_1 to SE1_12 and reception electrodes SE2_1 to SE2_n. FIG. 7A shows twelve transmission electrodes SE1_1 to SE1_12 as a representative example, however, the embodiment described herein is not limited thereto or thereby. For example, the input sensor ISP may include m transmission electrodes, and "m" may be a natural number smaller or greater than 12.

The transmission electrodes SE1_1 to SE1_12 may be grouped into a plurality of transmission electrode groups each of which includes four transmission electrodes. As an example, the transmission electrodes SE1_1 to SE1_12 may include first, second, and third transmission electrode groups GSE1, GSE2, and GSE3. The first transmission electrode group GSE1 may include first to fourth transmission electrodes SE1_1 to SE1_4 among the transmission electrodes SE1_1 to SE1_12, and the second transmission electrode group GSE2 may include fifth to eighth transmission electrodes SE1_5 to SE1_8 among the transmission electrodes SE1_1 to SE1_12. The third transmission electrode group GSE3 may include ninth to twelfth transmission electrodes SE1_9 to SE1_12 among the transmission electrodes SE1_1 to SE1_12. However, the embodiment described herein is not limited thereto or thereby. When the input sensor ISP includes m transmission electrodes, the transmission electrodes may be grouped into two or more transmission electrode groups each of which includes k electrodes. In this case, "k" may be an integer number smaller than "m".

Referring to FIGS. 7A and 7B, the controller CTR electrically connected to the input sensor ISP may substantially simultaneously transmit the scan signals to the transmission electrodes included in each transmission electrode group in one sensing frame 1F. That is, in the case where each transmission electrode group includes k transmission electrodes, the controller CTR may substantially simultaneously transmit the scan signals to the k transmission electrodes included in each transmission electrode group. As an example, in the case where each transmission electrode group includes four transmission electrodes, the controller CTR may substantially simultaneously transmit first to fourth scan signals Ts1 to Ts4 to the first to fourth transmission electrodes SE1_1 to SE1_4 included in the first transmission electrode group GSE1, respectively. In addition, the controller CTR may substantially simultaneously transmit fifth to eighth scan signals Ts5 to Ts8 to the fifth to eighth transmission electrodes SE1_5 to SE1_8 included in the second transmission electrode group GSE2, respectively. An interval during which the controller CTR transmits the scan signals Ts1 to Ts4 to the first transmission electrode group GSE1 may be referred to as a "first group interval Taa". The first group interval Taa may be the same as a sum of intervals t1 to t4 in which the first to fourth scan signals Ts1 to Ts4 are respectively transmitted to the first to fourth transmission electrodes SE1_1 to SE1_4.

The scan signal transmitted to one transmission electrode among the k transmission electrodes in each transmission electrode group by the controller CTR may be different from the scan signal transmitted to the other transmission electrodes in each transmission electrode group. As an example, in the first interval t1 of the first group interval Taa, there is a phase difference of about 180 degrees between the fourth scan signal Ts4 transmitted to the fourth transmission electrode SE1_4 and the first to third scan signals Ts1 to Ts3 respectively transmitted to the first to third transmission electrodes SE1_1 to SE1_3. In a second interval t2 of the first group interval Taa, there is a phase difference of about 180 degrees between the third scan signal Ts3 transmitted to the third transmission electrode SE1_3 and the first, second, and fourth scan signals Ts1, Ts2 and Ts4 respectively transmitted to the first, second, and fourth transmission electrodes SE1_1, SE1_2, and SE1_4. In a third interval t3 of the first group interval Taa, there is a phase difference of about 180 degrees between the second scan signal Ts2 transmitted to the second transmission electrode SE1_2 and the first, third, and fourth scan signals Ts1, Ts3, and Ts4 respectively transmitted to the first, third, and fourth transmission electrodes SE1_1, SE1_3, and SE1_4. In the fourth interval t4 of the first group interval Taa, there is a phase difference of about 180 degrees between the first scan signal Ts1 transmitted to the first transmission electrode SE1_1 and the second to fourth scan signals Ts2 to Ts4 respectively transmitted to the second to fourth transmission electrodes SE1_2 to SE1_4. That is, at least one of the first to fourth scan signals Ts1 to Ts4 may have the phase difference with respect to the other scan signals in each of the first to fourth intervals t1 to t4. Accordingly, although the controller CTR substantially simultaneously transmits the first to fourth scan signals Ts1 to Ts4 to the first transmission electrode group GSE1, the variation in capacitance of the capacitor formed between each of the first to fourth transmission electrodes SE1_1 to SE1_4 and each of the reception electrodes SE2_1 to SE2_n may be sensed.

Different from an individual driving method in which the controller CTR sequentially transmits the scan signals Ts1 to Ts12 to each of the transmission electrodes SE1_1 to SE1_12, a method in which the controller CTR substantially simultaneously transmits the scan signals to the transmission electrodes included in each transmission electrode group may be called a multi-channel driving (MCD) method. In the case where the input sensor ISP (refer to FIG. 3) included in the display device DD (refer to FIG. 3) is driven in the multi-channel driving method, a noise occurring in the input sensor ISP by the signals of the display panel DP (refer to FIG. 3) may be reduced compared with the noise occurring in the individual driving method. Therefore, a signal-to-noise ratio (SNR) of the input sensor ISP may increase, and thus, the performance of the input sensor ISP may be improved.

The number of the transmission electrodes included in each transmission electrode group of the input sensor ISP may be varied. When a noise signal of the input sensor ISP, which is generated by the signals of the display panel DP, is large while the image IM (refer to FIG. 1) is displayed through the display panel DP, the number of the transmission electrodes included in each transmission electrode group may increase. In the case where the input sensor ISP is operated in the multi-channel driving method, the signal-to-noise ratio of the input sensor ISP may increase as the number of the transmission electrodes included in each transmission electrode group increases. When the noise signal of the input sensor ISP, which is generated by the signals of the display panel DP, is small while the image IM (refer to FIG. 1) is displayed through the display panel DP, the number of the transmission electrodes included in each transmission electrode group may decrease. In the case where the input sensor ISP is operated in the multi-channel driving method, an increase in power consumption of the display device DD due to the multi-channel driving method may be minimized as the number of the transmission electrodes included in each transmission electrode group decreases. As an example, a method of driving the input sensor ISP in which m transmission electrodes SE1_1 to SE1_m are driven after being grouped into a plurality of transmission electrode groups each including k transmission electrodes is referred to as a first multi-channel driving method. A method of driving the input sensor ISP in which m transmission electrodes SE1_1 to SE1_m are driven after being grouped into a plurality of transmission electrode groups each including j transmission electrodes is referred to as a second multi-channel driving method. In this case, each of "k" and "j" may be an integer number smaller than "m", and "k" and "j" may be different integer numbers from each other.

In the case where the input sensor ISP is operated in the first multi-channel driving method, the controller CTR may substantially simultaneously transmit the scan signals to the k transmission electrodes included in each transmission electrode group among the plurality of transmission electrode groups. In the case where the input sensor ISP is operated in the second multi-channel driving method, the controller CTR may substantially simultaneously transmit the scan signals to the j transmission electrodes included in each transmission electrode group among the plurality of transmission electrode groups.

The input sensor ISP may be operated in the first or second multi-channel driving method depending on the image IM displayed through the display panel DP. As the input sensor ISP is operated in the first or second multi-channel driving method, the signal-to-noise ratio of the input sensor ISP may increase, and the increase in power consumption of the display device DD due to the multi-channel driving of the input sensor ISP may be minimized.

Figure 8A:
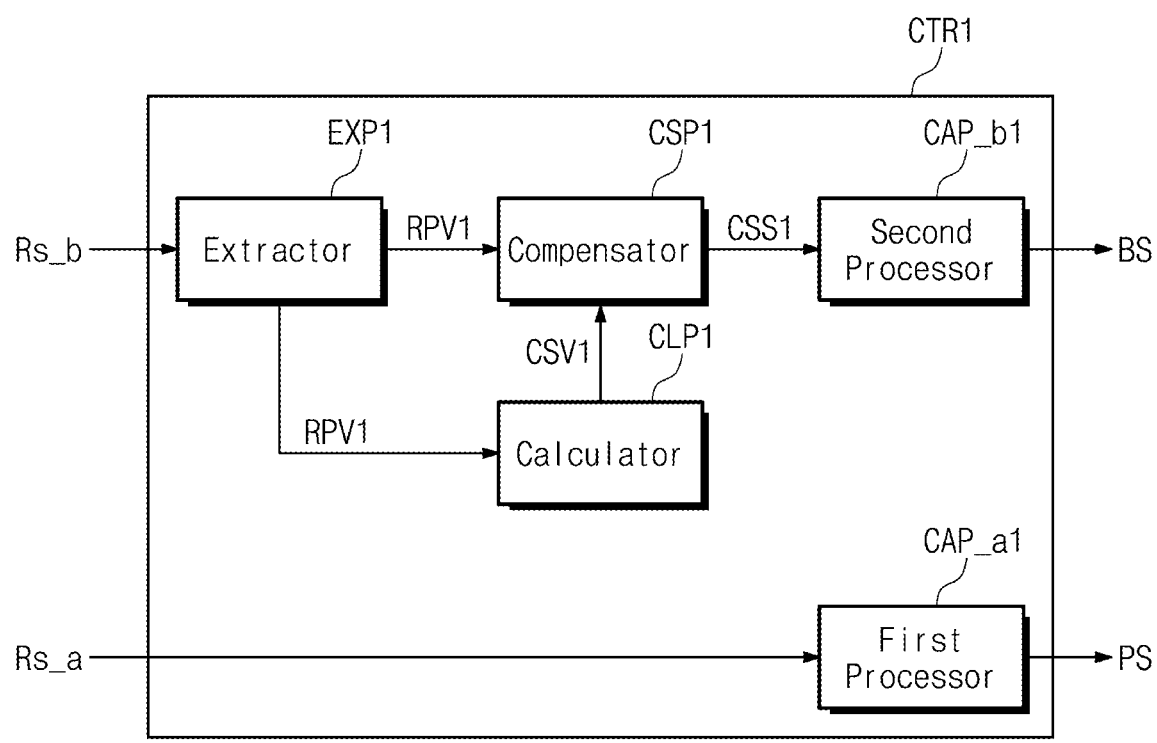
FIGS. 8A and 8B are block diagrams showing an operation of a controller according to an embodiment.
Figure 8B:
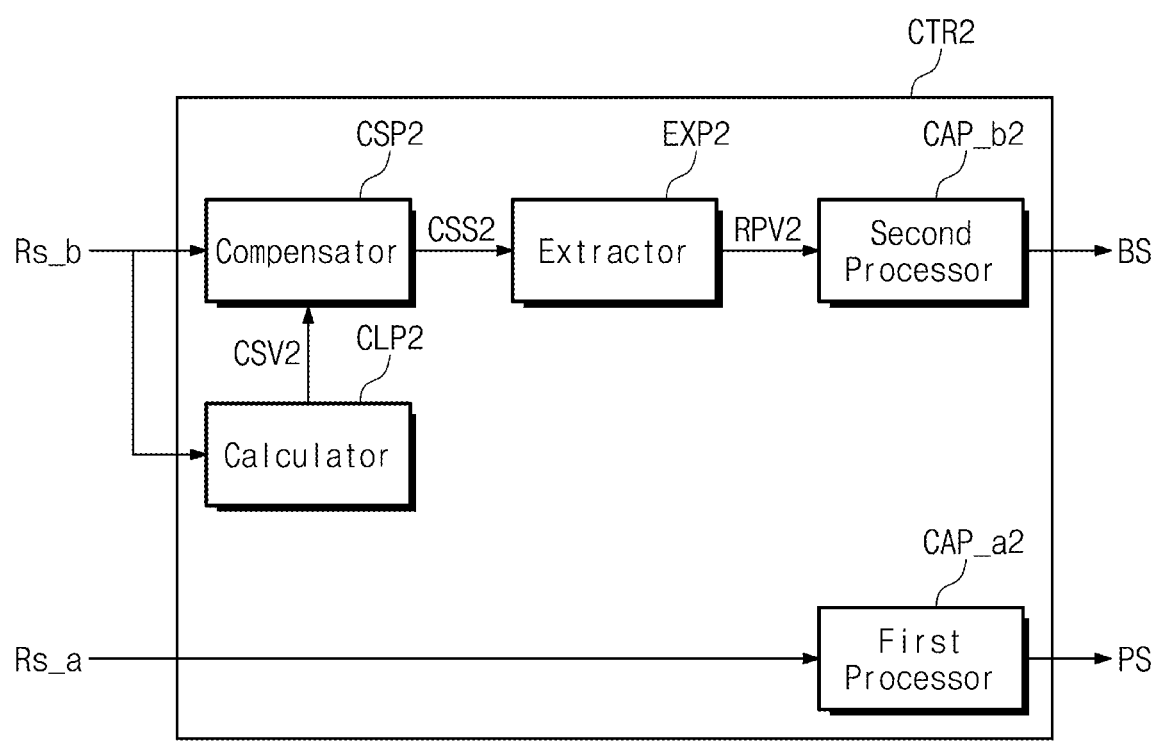

FIGS. 8A and 8B are block diagrams respectively showing an operation of controllers CTR1 and CTR2 according to an embodiment.

Referring to FIGS. 7A and 8A, the controller CTR1 may include an extractor EXP1, a compensator CSP1, a calculator CLP1, a first processor CAP_a1, and a second processor CAP_b1.

Hereinafter, for the convenience of explanation, sensing signals to which the variation in capacitance between the transmission electrodes SE1_1 to SE1_12 and the reception electrodes SE2_1 to SE2_n by the first external input TC1 is reflected are referred to as a first mode sensing signal Rs_a. Sensing signals to which the variation in capacitance between the transmission electrodes SE1_1 to SE1_12 and the reception electrodes SE2_1 to SE2_n by the second external input TC2 is reflected are referred to as a second mode sensing signal Rs_b. In addition, the display device DD employing the multi-channel driving method will be described as a representative example.

Although the first or second external input TC1 or TC2 caused by an object with one permittivity is applied to the display device DD, the variation in capacitance may vary depending on positions of the transmission electrodes SE1_1 to SE1_12 and the reception electrodes SE2_1 to SE2_n at which the capacitance is measured. The difference may be generated by a difference in capacitance of the capacitor between the transmission electrodes SE1_1 to SE1_12 and the reception electrodes SE2_1 to SE2_n, which is generated in performing processes for the input sensor ISP (refer to FIG. 3). In this case, the difference in capacitance of the capacitor between the transmission electrodes SE1_1 to SE1_12 and the reception electrodes SE2_1 to SE2_n, which is generated in manufacturing processes for the input sensor ISP (refer to FIG. 3), is defined as a first difference. In addition, in the case where the input sensor ISP is operated in the multi-channel driving method, the difference may be generated by a difference in capacitance variation between the transmission electrode groups, which is generated in calculating the variation in capacitance of the input sensor ISP. The difference in capacitance variation generated in calculating the variation in capacitance according to the multi-channel driving method of the input sensor ISP is defined as a second difference.

The first difference may be compensated for through a reliability test or the like after the input sensor ISP is manufactured, and thus, the first difference may be smaller than the second difference.

In the case where the controller CTR1 of the display device DD is operated in the first mode to sense the position of the first external input TC1, the position of the sensed first external input TC1 may not be distorted even though the first and second differences exists. The first external input TC1 may be provided to the display device DD as an input that touches a specific position of the display device DD to perform an arbitrary operation corresponding to the specific position. In the first mode, the controller CTR1 may receive the sensing signal to which the variation in capacitance with respect to the first external input TC1 is reflected. The controller CTR1 may compare the sensing signal with a predetermined reference value to sense whether a touch event occurs with respect to each coordinate. That is, although the first and second differences are generated in the variation in capacitance, the first and second differences do not significantly affect the comparison of the sensing signal with the reference value, and thus, the controller CTR1 may sense the position of the first external input TC1 without distortion. In addition, an area of the display device DD to which the first external input TC1 is applied may be included in an area in which one transmission electrode group is disposed. In this case, only the first difference may exist in the area to which the first external input TC1 is applied, and the second difference may not exist in the area to which the first external input TC1 is applied. Accordingly, in the case where the controller CTR1 is operated in the first mode, it is not necessary to compensate for the first mode sensing signal Rs_a to reduce the distortion caused by the second difference.

However, in the case where the controller CTR1 of the display device DD is operated in the second mode in which the biometric information with respect to the second external input TC2 are measured, the biometric information of the second external input TC2 may be distorted due to the first and second differences. The second external input TC2 may be generated by the user who touches a specific area of the display device DD and may be provided to the display device DD as an input to measure the biometric information corresponding to the specific area. In the second mode, the controller CTR1 may receive the second mode sensing signal Rs_b to which the variation in capacitance with respect to the second external input TC2 is reflected. The controller CTR1 may measure the biometric information based on the variation in capacitance between the transmission electrodes and the reception electrodes, which are arranged in the area of the display device DD to which the second external input TC2 is applied, before and after the second external input TC2 is applied. In this case, the area of the display device DD to which the second external input TC2 is applied to measure the biometric information may be greater than the area of the display device DD to which the first external input TC1 is applied for the touch. As an example, at least two transmission electrode groups may be included in the area to which the second external input TC2 is applied. In this case, the first difference and the second difference may exist in the area to which the second external input TC2 is applied. Different from the first mode in which the position of the first external input TC1 is sensed by comparing with the reference value, the biometric information with respect to the second external input TC2 may be measured based on the variation in capacitance before and after the second external input TC2 is applied in the second mode. Accordingly, when the second difference exists in the second mode, a difference may occur in the variation in capacitance corresponding to each transmission electrode group, and thus, the biometric information may be measured differently.

Accordingly, when the controller CTR1 is operated in the second mode, the controller CTR1 may compensate for the second mode sensing signal Rs_b to reduce the distortion due to the second difference.

As an example, the first processor CAP_a1 may compare the first mode sensing signal Rs_a with the predetermined reference value and may generate a position signal PS including the coordinate information of the position of the first external input TC1 in the first mode.

In the second mode, the extractor EXP1 may generate a representative value RPV1 with respect to each of the first to third transmission electrode groups GSE1 to GSE3 based on the second mode sensing signal Rs_b. In this case, as an example, the representative value RPV1 of each of the transmission electrode groups may be set to an average, median, or top 30% value of the second mode sensing signal Rs_b corresponding to each of the transmission electrode group. Hereinafter, for the convenience of explanation, a case where the representative value RPV1 is set to the average value of the second mode sensing signal Rs_b of each of the transmission electrode groups will be described as a representative example.

The calculator CLP1 may generate a compensation value CSV1 with respect to each of the first to third transmission electrode groups GSE1 to GSE3 based on the representative value RPV1. As an example, although the second external input TC2 with one permittivity is applied to the display device DD, the difference may occur in the variation in capacitance between the transmission electrode groups due to the second difference. Accordingly, a difference may occur in the representative value RPV1 of each of the transmission electrode groups generated based on the second mode sensing signal Rs_b. The compensation value CSV1 may be set to compensate for the difference occurring in the representative value RPV1 between the transmission electrode groups due to the second difference. As an example, the compensation value CSV1 may be generated by obtaining an average value of the representative values of the first to third transmission electrode groups GSE1 to GSE3 and comparing the average value with the representative value RPV1 of each of the transmission electrode groups. However, a method of setting the compensation value CSV1 is not limited thereto or thereby and may be set based on various criteria such that the distortion does not occur in the biometric information of the second external input TC2.

The compensator CSP1 may receive the representative value RPV1 from the extractor EXP1 and may receive the compensation value CSV1 from the calculator CLP1. The compensator CSP1 may compensate for the representative value RPV1 based on the compensation value CSV1 to generate a compensation sensing signal CSS1. The compensation sensing signal CSS1 may be a signal obtained by compensating for the difference in variation in capacitance between the transmission electrode groups due to the second difference when compared with the representative value RPV1. Accordingly, in the case where the biometric information are measured based on the compensation sensing signal CSS1, the distortion of the biometric information due to the second difference may be reduced.

The second processor CAP_b1 may receive the compensation sensing signal CSS1 from the compensator CSP1. The second processor CAP_b1 may generate a biometric information signal BS including the biometric information with respect to the second external input TC2 based on the compensation sensing signal CSS1. In this case, the biometric information may be a moisture level of the second external input TC2, however, it is not limited thereto or thereby. That is, a muscle mass may be measured as the biometric information. And an aging of the skin may be measured as the biometric information by judging a skin structure such as age spots, a scar, or the like. As an example, the controller CTR1 may not include the extractor EXP1. In this case, the calculator CLP1 may generate the compensation value with respect to each of the transmission electrodes SE1_1 to SE1_12 and the reception electrodes SE2_1 to SE2_n based on the second mode sensing signal Rs_b. In this case, the compensation value may be set to compensate for the difference in the variation in capacitance due to the first and second differences generated between each of the transmission electrodes SE1_1 to SE1_12 and each of the reception electrodes SE2_1 to SE2_n.

The compensator CSP1 may receive the second mode sensing signal Rs_b from the reception electrodes SE2_1 to SE2_n and may receive the compensation value from the calculator CLP1. The compensator CSP1 may compensate for the second mode sensing signal Rs_b based on the compensation value and may generate the compensation sensing signal. The compensation sensing signal may be a signal obtained by compensating for the difference in the variation in capacitance between each of the transmission electrodes SE1_1 to SE1_12 and each of the reception electrodes SE2_1 to SE2n due to the first and second differences when compared with the second mode sensing signal Rs_b.

Referring to FIGS. 7A and 8B, the controller CTR2 may include a compensator CSP2, a calculator CLP2, an extractor EXP2, a first processor CAP_a2, and a second processor CAP_b2.

Hereinafter, detailed descriptions of the same elements as those in FIG. 8A will be omitted for sake of brevity.

The calculator CLP2 may generate a compensation value CSV2 with respect to each of the transmission electrodes SE1_1 to SE1_12 and each of the reception electrodes SE2_1 to SE2_n based on the second mode sensing signal Rs_b. In this case, the compensation value CSV2 may be set to compensate for the difference in the variation in capacitance between each of the transmission electrodes SE1_1 to SE1_12 and each of the reception electrodes SE2_1 to SE2_n due to the first and second differences.

The compensator CSP2 may receive the second mode sensing signal Rs_b from the reception electrodes SE2_1 to SE2_n and may receive the compensation value CSV2 from the calculator CLP2. The compensator CSP2 may compensate for the second mode sensing signal Rs_b based on the compensation value CSV2 and may generate a compensation sensing signal CSS2. The compensation sensing signal CSS2 may be a signal obtained by compensating for the difference in the variation in capacitance between each of the transmission electrodes SE1_1 to SE1_12 and each of the reception electrodes SE2_1 to SE2n due to the first and second differences when compared with the second mode sensing signal Rs_b.

The extractor EXP2 may receive the compensation sensing signal CSS2 from the compensator CSP2. The extractor EXP2 may generate a representative value RPV2 with respect to each of the first to third transmission electrode groups GSE1 to GSE3 based on the compensation sensing signal CSS2.

The second processor CAP_b2 may receive the representative value RPV2 from the extractor EXP2. The second processor CAP_b2 may generate a biometric information signal BS including biometric information with respect to the second external input TC2 based on the representative value RPV2.

As an example, the controller CTR2 may not include the extractor EXP2. In this case, the second processor CAP_b2 may generate the biometric information signal BS based on the compensation sensing signal CSS2.

Figure 9B:
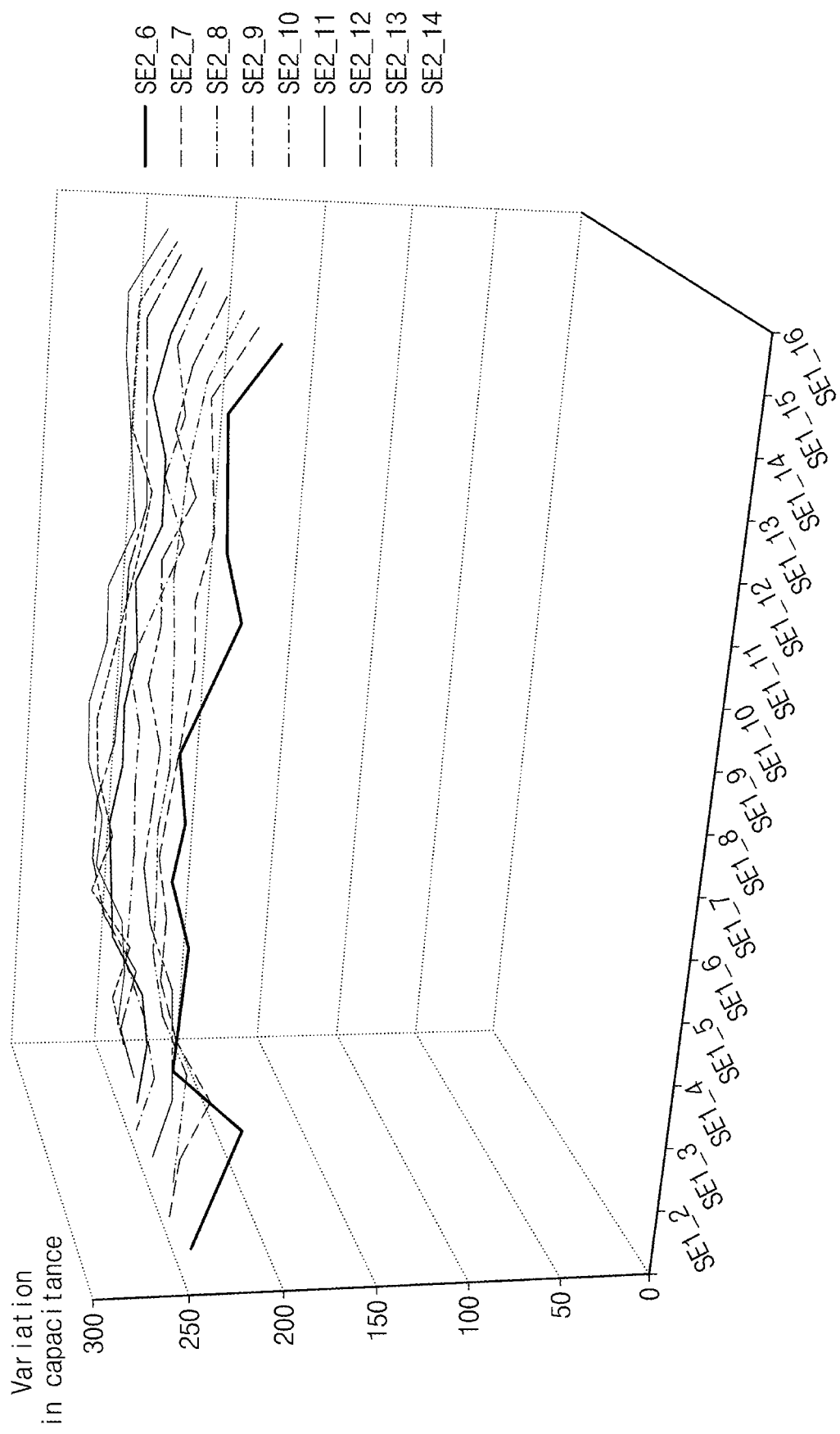
FIG. 9B is a graph showing the variation in capacitance before the compensation shown in FIG. 9A according to the position.

FIG. 9A is a table showing the variation in capacitance by the second external input before the compensation according to a position, and FIG. 9B is a graph showing the variation in capacitance before the compensation shown in FIG. 9A according to the position.

Referring to FIG. 9A, the variation in capacitance between the transmission electrodes and the reception electrodes, which is measured when the second external input TC2 (referring to FIG. 3) is applied to the display device DD (referring to FIG. 1), is written for each unit area UA. A signal to which the variation in capacitance shown in FIG. 9A is reflected may be the second mode sensing signal Rs_b. For the convenience of explanation, FIGS. 9A, 10A, 10B, and 11A show the variation in capacitance of capacitors formed between sixteen transmission electrodes SE1_1 to SE1_16 and twenty-two reception electrodes SE2_1 to SE2_22. In addition, the transmission electrodes SE1_1 to SE1_16 may be grouped into four transmission electrode groups GSE1 to GSE4 each of which includes four transmission electrodes.

The controller CTR (refer to FIG. 6A) may compare the variation in capacitance between each of the transmission electrodes SE1_1 to SE1_16 and each of the reception electrodes SE2_1 to SE2_22 with a predetermined condition value. An area in which the variation in capacitance equal to or greater than the condition value is formed may be defined as a touch area TOA. In the embodiment described herein, in a case where the condition value is set to 220, the touch area TOA may be defined as an area in which the variation in capacitance is set to be equal to or greater than 220.

Referring to FIGS. 9A and 9B, the variation in capacitance included in the touch area TOA may vary depending on positions of the transmission electrodes SE1_1 to SE1_16 and positions of the reception electrodes SE2_1 to SE2_22. The difference may be generated by the second difference.

Figure 10B:
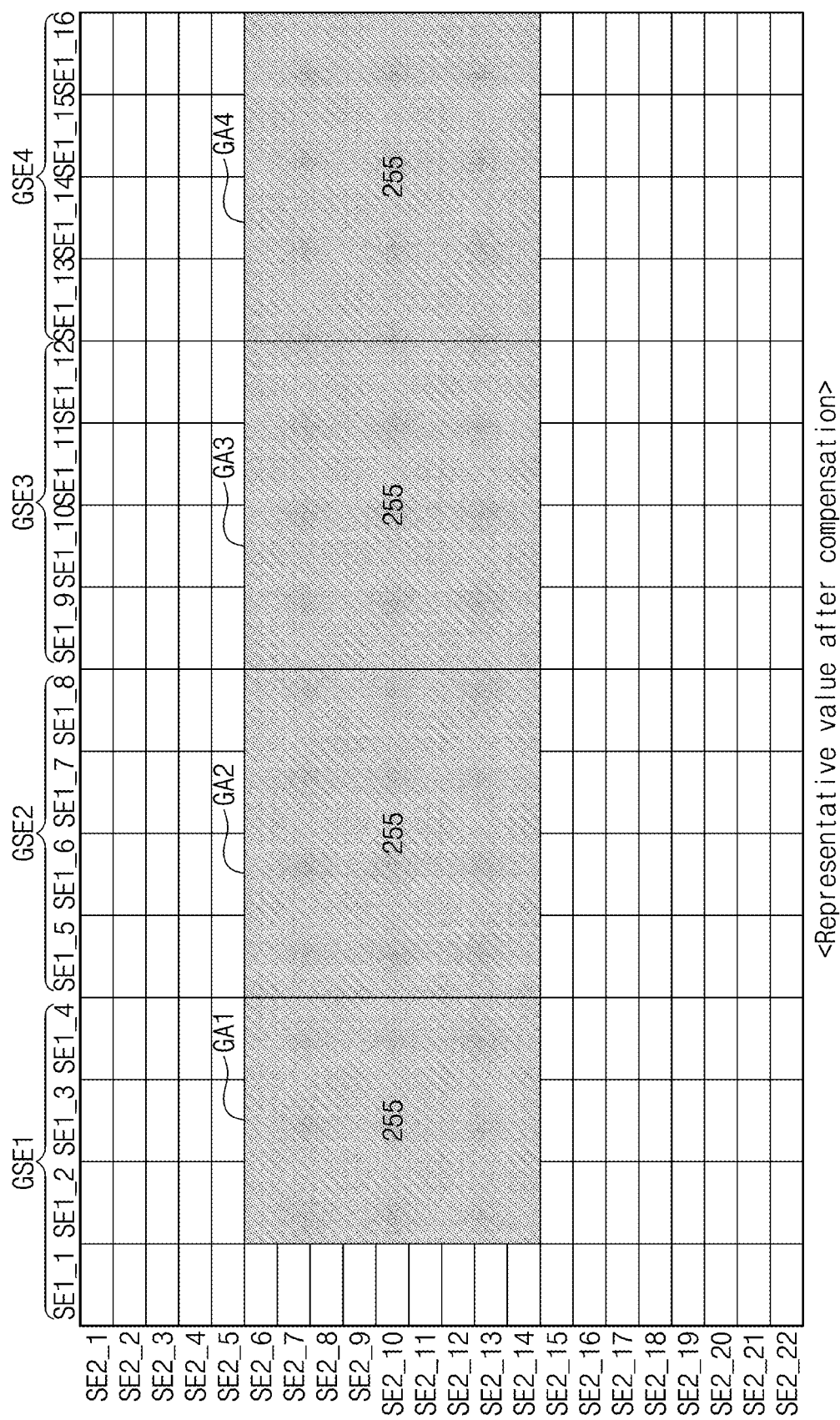
FIG. 10B is a table showing a representative value after the compensation, which is obtained by compensating for the representative value before the compensation shown in FIG. 10A based on a compensation value, according to the position.
Figure 10C:
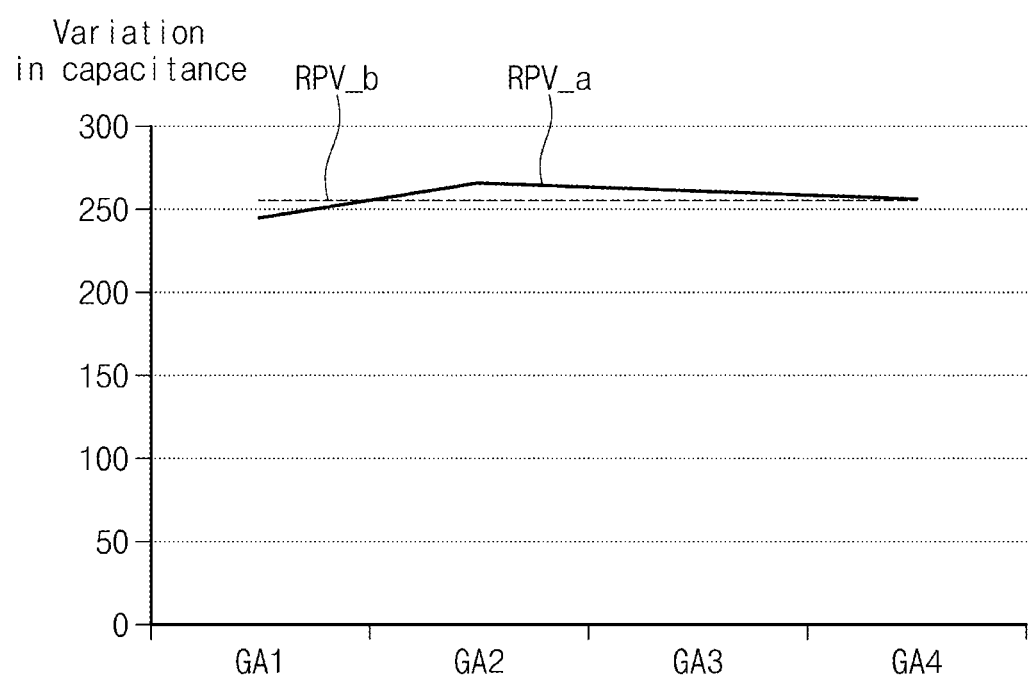
FIG. 10C is a graph showing the representative value before the compensation shown in FIG. 10A and the representative value after the compensation shown in FIG. 10B according to the position.

FIG. 10A is a table showing a representative value, which is generated based on a second mode sensing signal, before compensation according to a position, FIG. 10B is a table showing a representative value after the compensation, which is obtained by compensating for the representative value before the compensation shown in FIG. 10A based on a compensation value, according to the position, and FIG. 10C is a graph showing the representative value before the compensation shown in FIG. 10A and the representative value after the compensation shown in FIG. 10B according to the position.

Referring to FIGS. 10A and 100, the representative value RPV_a (hereinafter, referred to as a first representative value) before the compensation, which is generated based on the second mode sensing signal Rs_b (refer to FIG. 8A), with respect to a first group area to a fourth group area GA1 to GA4 respectively corresponding to the first transmission electrode group to the fourth transmission electrode group GSE1 to GSE4 included in the touch area TOA (refer to FIG. 9A) is shown.

Referring to FIGS. 10B and 10C, the representative value RPV_b (hereinafter, referred to as a second representative value) after the compensation, which is generated by compensating for the first representative value RPV_a based on the compensation value CSV1 (refer to FIG. 8A) is shown. As an example, the second representative value RPV_b may be output from the compensator CSP1 (refer to FIG. 8A) as the compensation sensing signal CSS1.

Referring to FIG. 10C, the first representative values RPV_a respectively corresponding to the first to fourth group areas GA1 to GA4 are different from each other due to the second difference. However, since the second difference is compensated for in the second representative value RPV_b, the second representative values RPV_b respectively corresponding to the first to fourth group areas GA1 to GA4 may not differ from each other. Accordingly, in the case where the biometric information of the second external input TC2 are measured based on the compensation sensing signal CSS1 (refer to FIG. 8A) to which the second representative value RPV_b is reflected, the distortion of the measured biometric information may be reduced when compared with the biometric information measured based on the first representative value RPV_a.

Figure 11A:
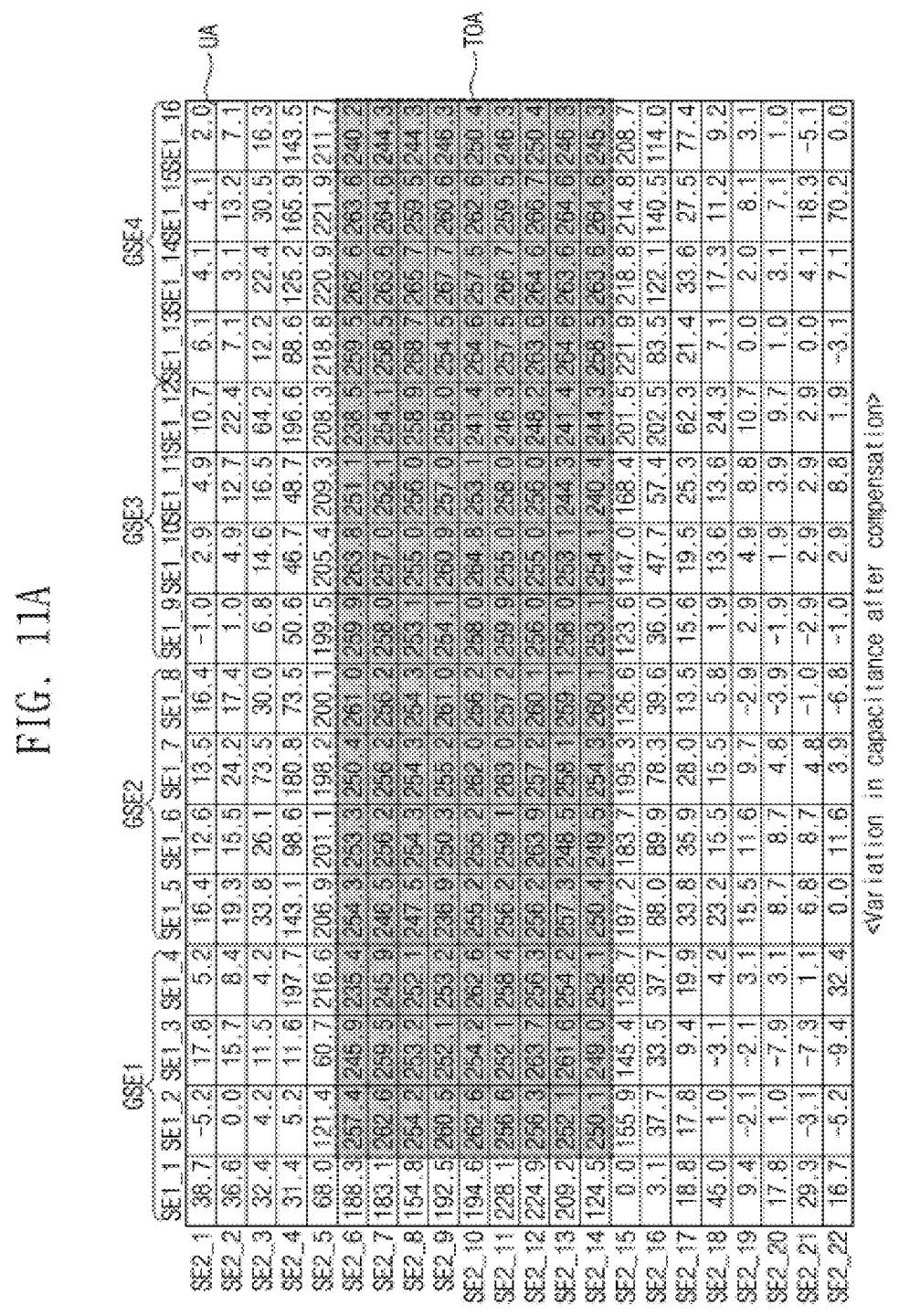
Figure 11B:
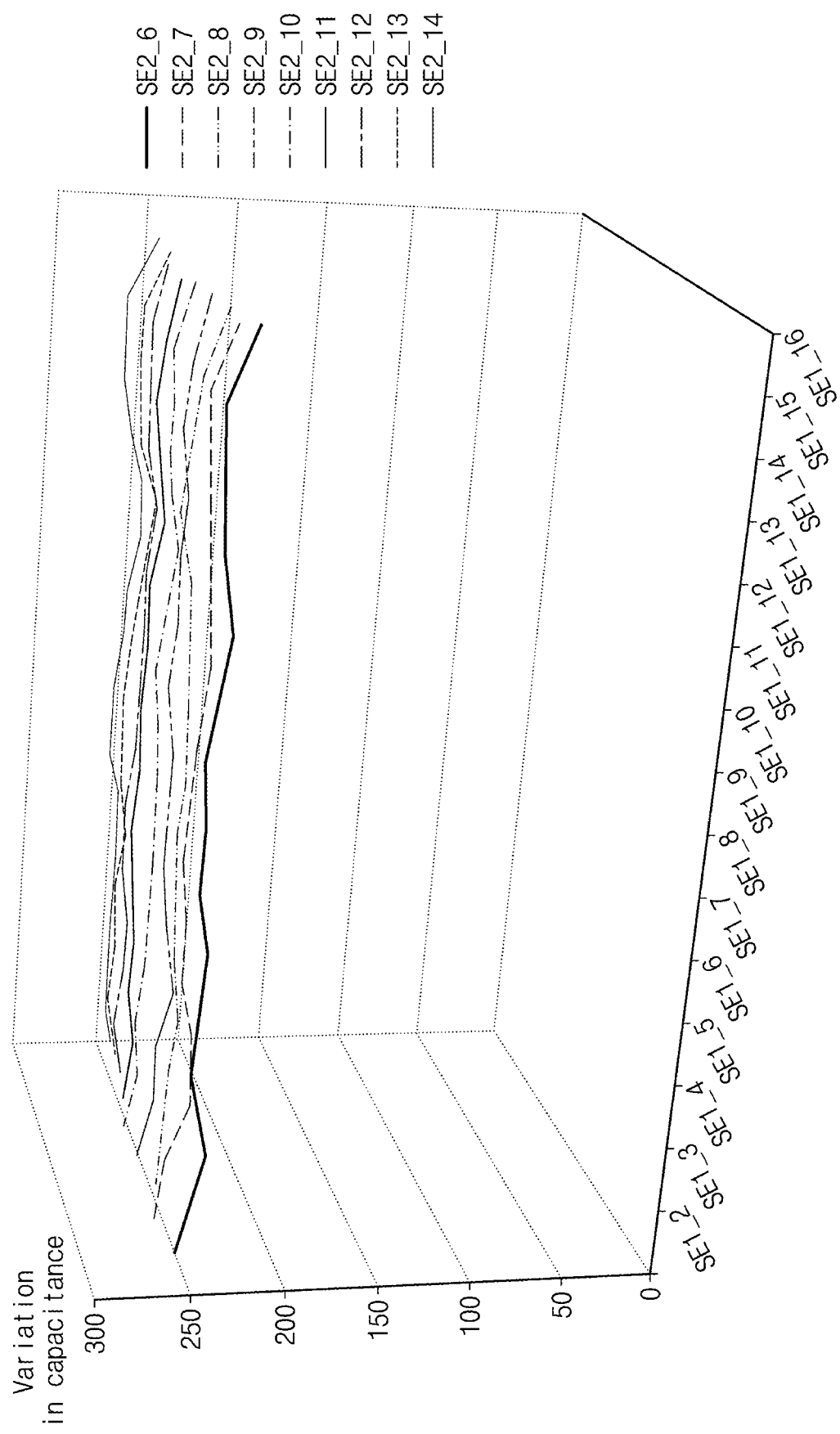
FIG. 11B is a graph showing the variation in capacitance after the compensation shown in FIG. 11A according to the position.

FIG. 11A is a table showing a variation in capacitance after the compensation, which is obtained by compensating for the variation in capacitance before the compensation shown in FIG. 9A based on the compensation value, according to the position. FIG. 11B is a graph showing the variation in capacitance after the compensation shown in FIG. 11A according to the position.

Referring to FIG. 11A, the variation in capacitance after the compensation, which is obtained by compensating for the second mode sensing signal Rs_b based on the compensation value, is written for each unit area UA. As an example, a signal to which the variation in capacitance after the compensation is reflected may be output from the compensator CSP2 (refer to FIG. 8B) as the compensation sensing signal CSS2.

Referring to FIGS. 9B and 11B, when compared with the variation in capacitance before the compensation included in the touch area TOA, the difference according to the positions of the transmission electrodes SE1_1 to SE1_16 and the positions of the reception electrodes SE2_1 to SE2_22 may be reduced in the variation in capacitance after the compensation included in the touch area TOA. Accordingly, the representative value RPV2 (refer to FIG. 8B) with respect to each of the first to fourth transmission electrode groups GSE1 to GSE4 may be generated based on the compensation sensing signal CSS2 (refer to FIG. 8B) to which the variation in capacitance after the compensation is reflected. In the case where the biometric information of the second external input TC2 are measured based on the representative value RPV2, the distortion of the biometric information may be reduced when compared with the case where the biometric information are measured based on the representative value generated in response to the second mode sensing signal Rs_b (refer to FIG. 8B) to which the variation in capacitance before the compensation is reflected.

Figure 12A:
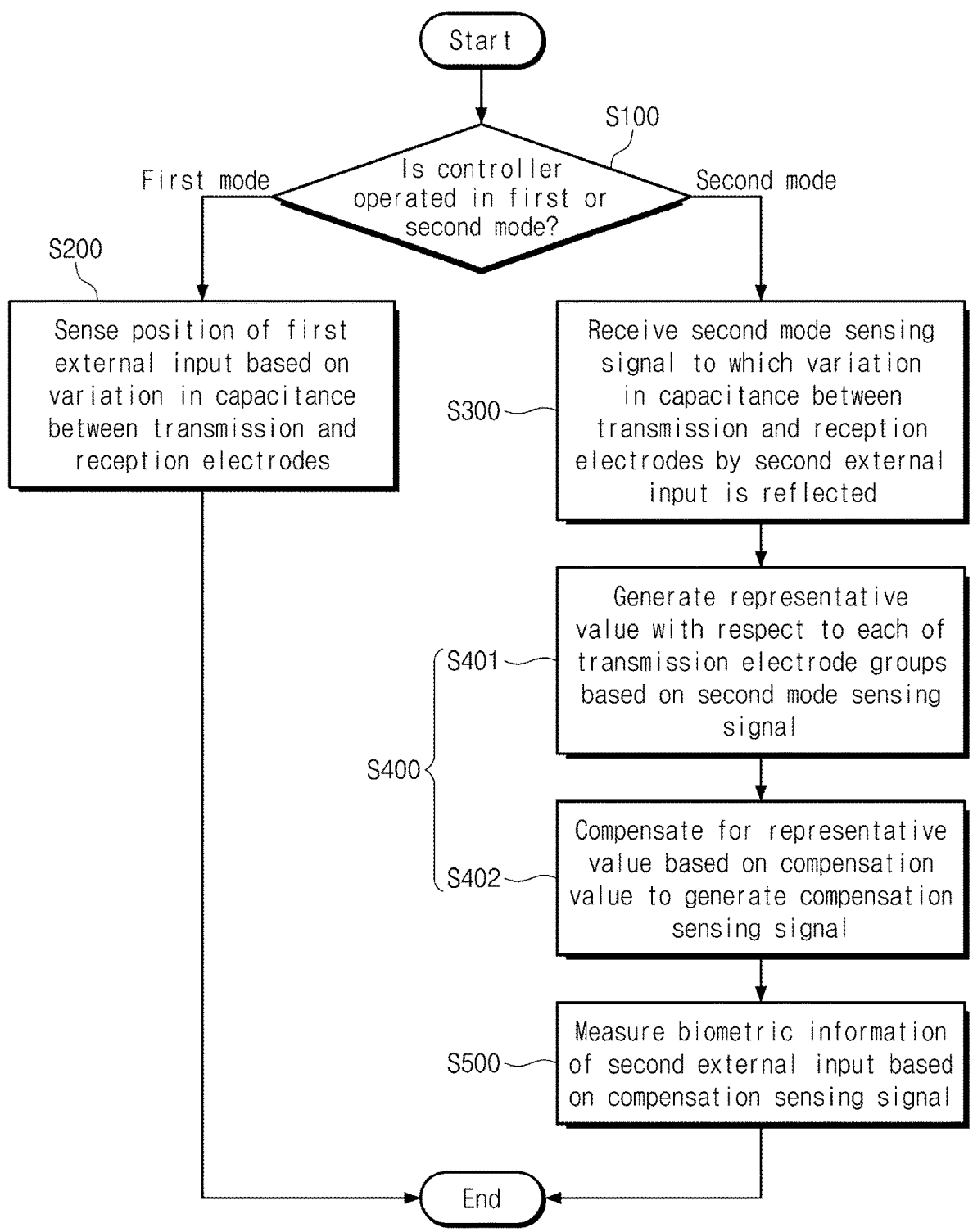
FIGS. 12A and 12B are flowcharts showing an operation of a controller according to an embodiment.
Figure 12B:
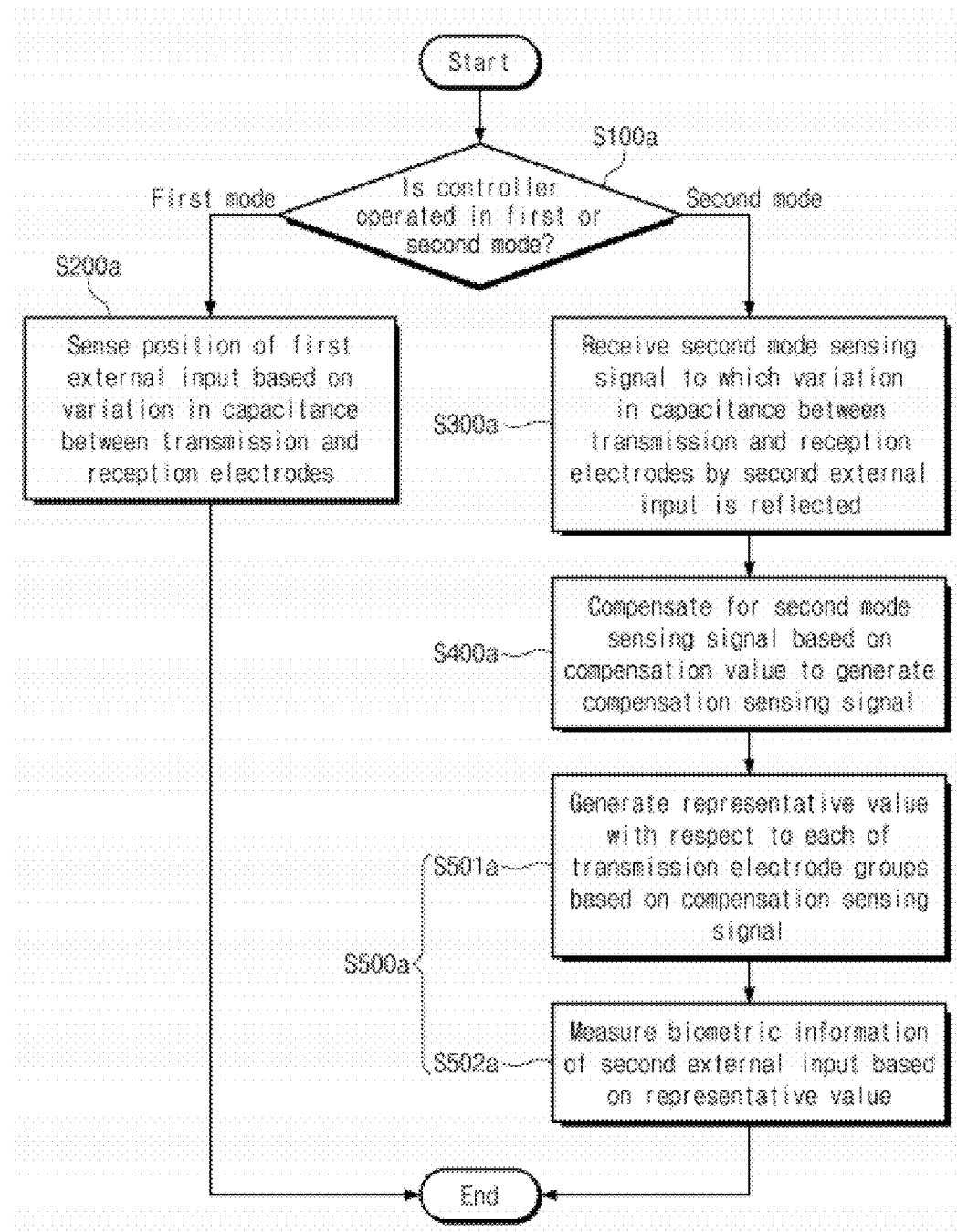

FIGS. 12A and 12B are flowcharts showing an operation of a controller according to an embodiment.

Referring to FIGS. 7A, 8A, and 12A, the controller CTR1 is operated in the first mode or the second mode in response to the external input applied to the display device DD (refer to FIG. 1). That is, when the first external input TC1 is applied to the display device DD, the controller CTR1 is operated in the first mode, and when the second external input TC2 is applied to the display device DD, the controller CTR1 is operated in the second mode (S100).

When the controller CTR1 is operated in the first mode, the controller CTR1 receives the sensing signals Rs1 to Rsn to which the variation in capacitance between the transmission electrodes SE1_1 to SE1_12 and the reception electrodes SE2_1 to SE2_n by the first external input TC1 is reflected as the first mode sensing signal Rs_a. The controller CTR1 senses the position of the first external input TC1 based on the first mode sensing signal RS_a (S200).

When the controller CTR1 is operated in the second mode, the controller CTR1 receives the sensing signals Rs1 to Rsn to which the variation in capacitance between the transmission electrodes SE1_1 to SE1_12 and the reception electrodes SE2_1 to SE2_n by the second external input TC2 is reflected as the second mode sensing signal Rs_b (S300). Then, the received second mode sensing signal Rs_b is compensated for based on the compensation value CSV1, and the compensation sensing signal CSS1 is generated (S400). In this case, the generating of the compensation sensing signal CSS1 (S400) includes extracting the representative value RPV1 with respect to each of the transmission electrode groups GSE1 to GSE3 based on the second mode sensing signal Rs_b (S401) and compensating for the representative value RPV1 based on the compensation value CSV1 to generate the compensation sensing signal CSS1 (S402). In addition, the controller CTR1 measures the biometric information of the second external input TC2 based on the compensation sensing signal CSS1 (S500).

Referring to FIGS. 7A, 8B, and 12B, when the second mode is selected, the controller CTR2 receives the second mode sensing signal Rs_b (S300a). Then, the received second mode sensing signal Rs_b is compensated for based on the compensation value CSV2, and the compensation sensing signal CSS2 is generated (S400a). In addition, the biometric information of the second external input TC2 are measured based on the compensation sensing signal CSS2 (S500a). In this case, the measuring of the biometric information (S500a) includes extracting the representative value RPV2 with respect to each of the transmission electrode groups GSE1 to GSE3 based on the compensation sensing signal CSS2 (S501a) and measuring the biometric information of the second external input TC2 based on the representative value RPV2 (S502a). As an example, the controller CTR2 may further generate the compensation value CSV2 with respect to each of the transmission electrode groups based on the second mode sensing signal Rs_b.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel configured to display an image;
an input sensor disposed on the display panel; and
a controller electrically connected to the input sensor, the input sensor comprising:
a transmission electrode; and
a reception electrode electrically insulated from the transmission electrode, wherein the controller is electrically connected to the transmission and reception electrodes, and wherein the controller is configured to:
transmit a scan signal to the transmission electrode,
sense, when operated in a first mode, a position at which a first external input is generated, and measure, when operated in a second mode, biometric information with respect to a second external input,
sense, when operated in the first mode, the position based on a first mode sensing signal to which a variation in capacitance between the transmission electrode and the reception electrode by the first external input is reflected,
compensate, when operated in the second mode, for a second mode sensing signal to which a variation in capacitance between the transmission electrode and the reception electrode by the second external input is reflected based on a compensation value to generate a compensation sensing signal, and
measure, when operated in the second mode, the biometric information based on the compensation sensing signal.

2. The display device of claim 1, wherein the biometric information is a moisture level.

3. The display device of claim 1, wherein the transmission electrode comprises m transmission electrodes, the reception electrode comprises n reception electrodes, wherein m and n are each integer values greater than or equal to 1.

4. The display device of claim 3, wherein the m transmission electrodes are grouped into a plurality of transmission electrode groups each comprising k transmission electrodes, wherein k is an integer value smaller than m, and the controller transmits, at substantially the same time, the scan signal to the k transmission electrodes included in each transmission electrode group among the plurality of transmission electrode groups.

5. The display device of claim 4, wherein the controller comprises:
   an extractor configured to generate a representative value with respect to each of the plurality of transmission electrode groups based on the second mode sensing signal;
   a calculator configured to generate the compensation value with respect to each of the plurality of transmission electrode groups based on the representative value; and
   a compensator configured to compensate for the representative value based on the compensation value to generate the compensation sensing signal.

6. The display device of claim 4, wherein the controller comprises:
   a calculator configured to generate the compensation value with respect to each of the plurality of transmission electrode groups based on the second mode sensing signal; and
   a compensator configured to compensate for the second mode sensing signal based on the compensation value to generate the compensation sensing signal.

7. The display device of claim 6, wherein the controller further comprises an extractor configured to generate a representative value with respect to each of the plurality of transmission electrode groups based on the compensation sensing signal.

8. The display device of claim 3, wherein the m transmission electrodes are grouped into a plurality of transmission electrode groups each comprising k transmission electrodes while being driven in a first multi-channel driving method, the m transmission electrodes are grouped into a plurality of transmission electrode groups each comprising j transmission electrodes while being driven in a second multi-channel driving method, wherein k and j are each an integer value smaller than m, and wherein k and j are integer values different from each other.

9. The display device of claim 8, wherein the controller transmits, at substantially the same time, the scan signal to the k transmission electrodes included in each transmission electrode group among the plurality of transmission electrode groups while being driven in the first multi-channel driving method, and the controller substantially simultaneously transmits the scan signal to the j transmission electrodes included in each transmission electrode group among the plurality of transmission electrode groups while being driven in the second multi-channel driving method.

10. The display device of claim 1, wherein the display panel comprises:
    a display element layer comprising a light emitting element; and
    an encapsulation layer disposed on the display element layer.

11. The display device of claim 10, wherein the input sensor is disposed directly on the encapsulation layer.

12. The display device of claim 1, further comprising an adhesive film disposed between the display panel and the input sensor.

13. A method of driving a display device comprising a display panel displaying an image, an input sensor disposed on the display panel and including a transmission electrode and a reception electrode electrically insulated from the transmission electrode, and a controller electrically connected to the input sensor, electrically connected to the transmission and reception electrodes, transmitting a scan signal to the transmission electrode, the method comprising:
    determining an operation mode including a first mode and a second mode based on an external input;
    sensing, when the operation mode is the first mode, a position at which a first external input is generated;
    compensating, when the operation mode is the second mode, a compensation sensing signal by compensating a second mode sensing signal based on a compensation value; and
    measuring, when the operation mode is the second mode, biometric information based on the compensation sensing signal,
    wherein, when the operation mode is the first mode, the position is based on a first mode sensing signal to which a variation in capacitance between the transmission electrode and the reception electrode by the first external input is reflected, and
    wherein the second mode sensing signal is a signal to which a variation in capacitance between the transmission electrode and the reception electrode by a second external input is reflected.

14. The method of claim 13, wherein the biometric information is a moisture level.

15. The method of claim 13, wherein the transmission electrode comprises m transmission electrodes, the reception electrode comprises n reception electrodes, wherein m and n are each integer values equal to or greater than 1.

16. The method of claim 15, wherein the m transmission electrodes are grouped into a plurality of transmission electrode groups each comprising k transmission electrodes, the controller transmits, at substantially the same time, the scan signal to the k transmission electrodes included in each transmission electrode group among the plurality of transmission electrode groups, wherein k is an integer value smaller than m.

17. The method of claim 16, wherein the compensating of the compensation sensing signal comprises:
    generating a representative value with respect to each of the plurality of transmission electrode groups based on the second mode sensing signal;
    generating the compensation value with respect to each of the plurality of transmission electrode groups based on the representative value; and
    compensating for the representative value based on the compensation value to generate the compensation sensing signal.

18. The method of claim 16, wherein the compensating of the compensation sensing signal comprises:
    generating the compensation value with respect to each of the plurality of transmission electrode groups based on the second mode sensing signal; and
    compensating for the second mode sensing signal based on the compensation value to generate the compensation sensing signal.

19. The method of claim 18, wherein the measuring of the biometric information comprises generating a representative value with respect to each of the plurality of transmission electrode groups based on the compensation sensing signal.

20. A method of driving a display device comprising a display panel displaying an image, an input sensor disposed on the display panel and including a transmission electrode and a reception electrode electrically insulated from the transmission electrode, and a controller electrically connected to the input sensor, electrically connected to the transmission and reception electrodes, transmitting a scan signal to the transmission electrode, operated in a first mode to sense a position at which a first external input is generated, and operated in a second mode to measure biometric information with respect to a second external input, the method comprising:

selecting one of the first mode and the second mode;

sensing, when the first mode is selected, the position based on a first mode sensing signal to which a variation in capacitance between the transmission electrode and the reception electrode by the first external input is reflected;

compensating, when the second mode is selected, for a second mode sensing signal to which a variation in capacitance between the transmission electrode and the reception electrode by the second external input is reflected based on a compensation value to generate a compensation sensing signal; and measuring, when the second mode is selected, the biometric information based on the compensation sensing signal, wherein the transmission electrode comprises m transmission electrodes, the reception electrode comprises n reception electrodes, wherein m and n are each integer values equal to or greater than 1, and wherein the m transmission electrodes are grouped into a plurality of transmission electrode groups each comprising k transmission electrodes while being driven in a first multi-channel driving method, the m transmission electrodes are grouped into a plurality of transmission electrode groups each comprising j transmission electrodes while being driven in a second multi-channel driving method, the controller substantially simultaneously transmits the scan signal to the k transmission electrodes included in each transmission electrode group among the plurality of transmission electrode groups while being driven in the first multi-channel driving method and substantially simultaneously transmits the scan signal to the j transmission electrodes included in each transmission electrode group among the plurality of transmission electrode groups while being driven in the second multi-channel driving method, each wherein k and j are each an integer value smaller than m, and wherein k and j are integer values different from each other.

* * * * *